United States Patent
Kagami et al.

(10) Patent No.: US 6,839,815 B2
(45) Date of Patent: Jan. 4, 2005

(54) SYSTEM AND METHOD FOR STORAGE ON DEMAND SERVICE IN A GLOBAL SAN ENVIRONMENT

(75) Inventors: Akira Kagami, Los Gatos, CA (US); Akira Yamamoto, Cupertino, CA (US); Masayuki Yamamoto, Sunnyvale, CA (US)

(73) Assignee: Hitachi, Ltd. (JP)

( * ) Notice: Subject to any disclaimer, the term of this patent is extended or adjusted under 35 U.S.C. 154(b) by 0 days.

(21) Appl. No.: 09/850,904

(22) Filed: May 7, 2001

(65) Prior Publication Data

US 2002/0166033 A1 Nov. 7, 2002

(51) Int. Cl.⁷ .............................................. G06F 12/00
(52) U.S. Cl. ...................... 711/148; 149/150; 149/151; 707/205; 709/223; 709/224; 709/225; 709/226
(58) Field of Search ................................. 711/146, 147, 711/148, 150, 151; 707/205; 709/223, 226, 227

(56) References Cited

U.S. PATENT DOCUMENTS

| | | | |
|---|---|---|---|
| 4,310,883 A | | 1/1982 | Clifton et al. |
| 4,771,375 A | | 9/1988 | Beglin et al. |
| 5,018,060 A | | 5/1991 | Gelb et al. |
| 5,758,050 A | | 5/1998 | Brady et al. |
| 5,826,239 A | * | 10/1998 | Du et al. .................... 714/9 |
| 6,023,733 A | * | 2/2000 | Periasamy et al. .......... 709/241 |
| 6,044,442 A | | 3/2000 | Jesionowski |
| 6,098,128 A | * | 8/2000 | Velez-McCaskey et al. .. 710/65 |
| 6,148,414 A | * | 11/2000 | Brown et al. ................ 714/9 |
| 6,192,454 B1 | | 2/2001 | De Vos |
| 6,209,024 B1 | | 3/2001 | Armstrong et al. |
| 6,230,247 B1 | | 5/2001 | Cannon et al. |
| 6,253,240 B1 | * | 6/2001 | Axberg et al. ............... 709/223 |
| 6,259,405 B1 | * | 7/2001 | Stewart et al. .............. 342/457 |
| 6,263,350 B1 | | 7/2001 | Wollrath et al. |
| 6,279,040 B1 | | 8/2001 | Ma et al. |
| 6,289,375 B1 | * | 9/2001 | Knight et al. ................ 709/217 |
| 6,356,985 B1 | | 3/2002 | Ichimi et al. |
| 6,389,420 B1 | * | 5/2002 | Vahalia et al. .................. 707/8 |
| 6,389,432 B1 | * | 5/2002 | Pothapragada et al. ..... 707/205 |
| 6,484,160 B1 | | 11/2002 | Richard et al. |
| 6,496,856 B1 | * | 12/2002 | Kenner et al. ............... 709/218 |
| 6,502,136 B1 | | 12/2002 | Higuchi et al. |
| 6,519,471 B1 | | 2/2003 | Yamaguchi |
| 6,553,401 B1 | | 4/2003 | Carter et al. |
| 6,597,956 B1 | | 7/2003 | Aziz et al. |
| 6,640,278 B1 | | 10/2003 | Nolan et al. |
| 6,654,830 B1 | | 11/2003 | Taylor et al. |
| 6,665,706 B2 | | 12/2003 | Kenner et al. |
| 2001/0056480 A1 | | 12/2001 | Taylor et al. |
| 2002/0091828 A1 | | 7/2002 | Kitamura et al. |
| 2002/0112043 A1 | | 8/2002 | Kagami et al. |
| 2002/0152364 A1 | | 10/2002 | Gunaseelan et al. |
| 2002/0162047 A1 | | 10/2002 | Peters et al. |
| 2003/0177162 A1 | | 9/2003 | Staiger et al. |

* cited by examiner

Primary Examiner—Donald Sparks
Assistant Examiner—Ngoc V Dinh
(74) Attorney, Agent, or Firm—Squire, Sanders & Dempsey L.L.P.

(57) ABSTRACT

The present invention provides improved techniques for managing storage resources, such as disk drives, I/O ports, and the like distributed among a plurality of sites according to user demand for these storage resources. Specific embodiments provide users the capability to bring new resources on line, define pathways between resources, and the like. Embodiments can obviate the need for system programmers to manually configure storage resources at a user's site.

24 Claims, 27 Drawing Sheets

Overall Configuration of Storage on Demand Service System in a Global SAN Environment

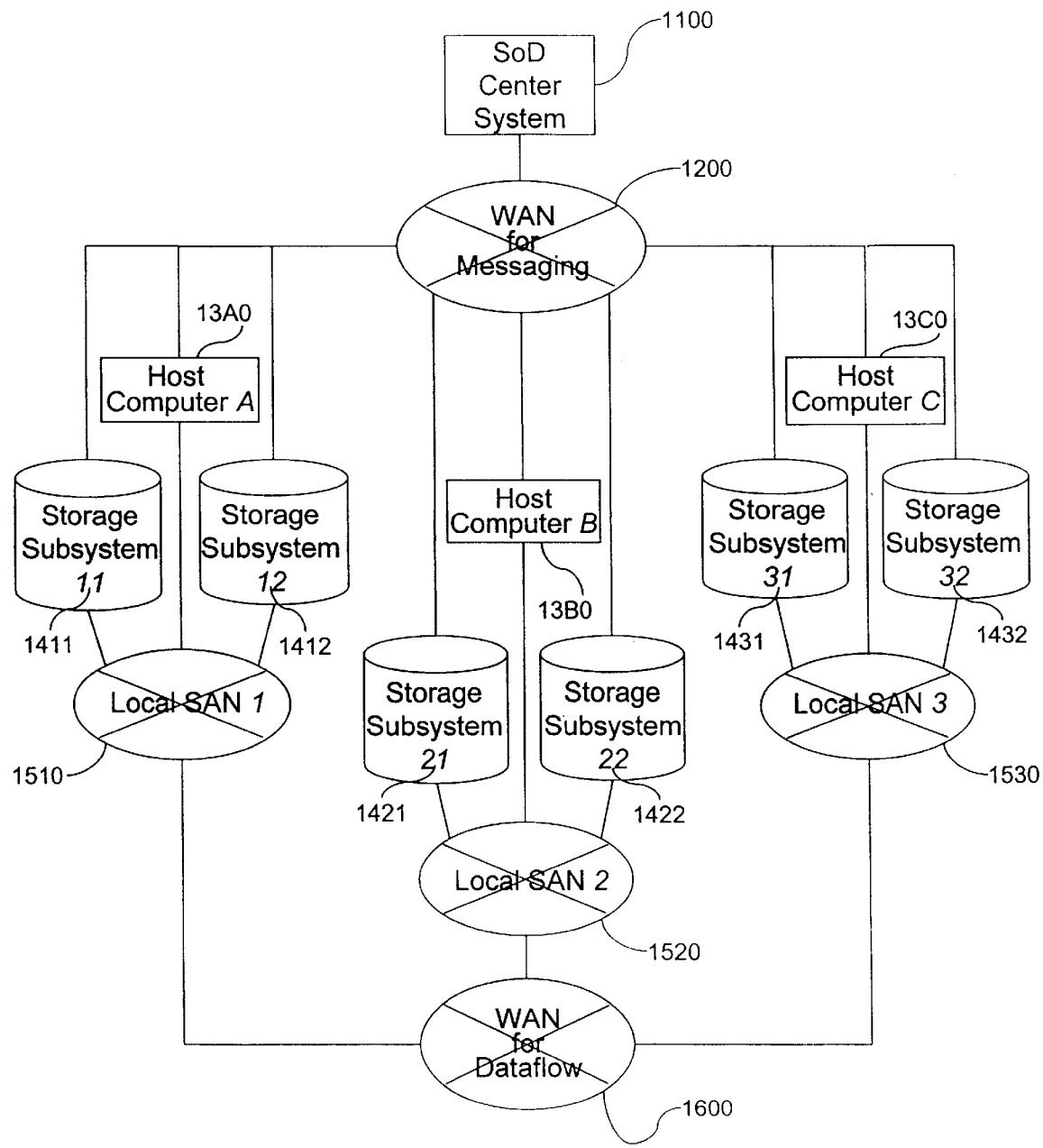
Fig. 1: Overall Configuration of Storage on Demand Service System in a Global SAN Environment Fig. 2A: Configuration of Host Computer A (13A0)
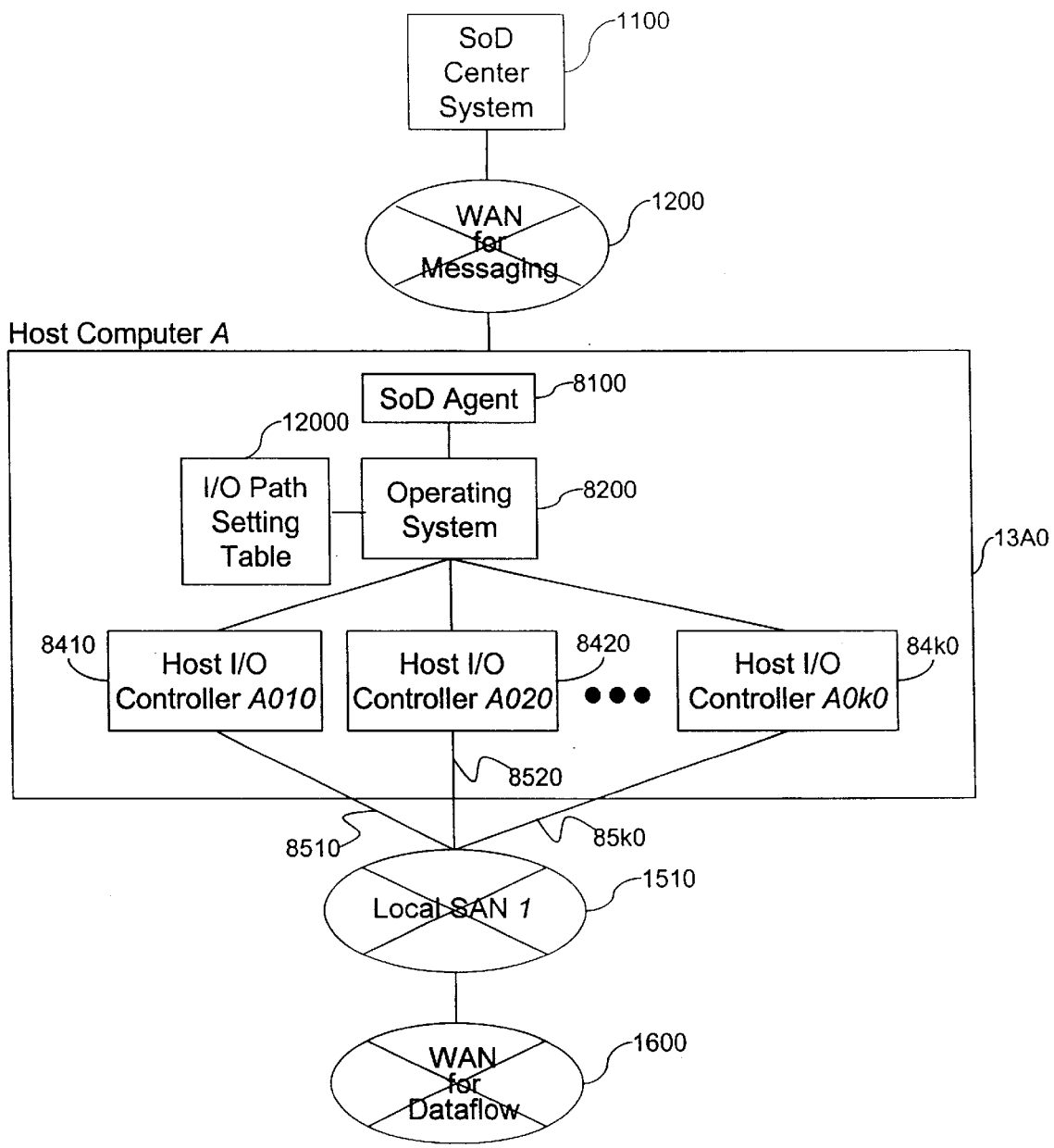

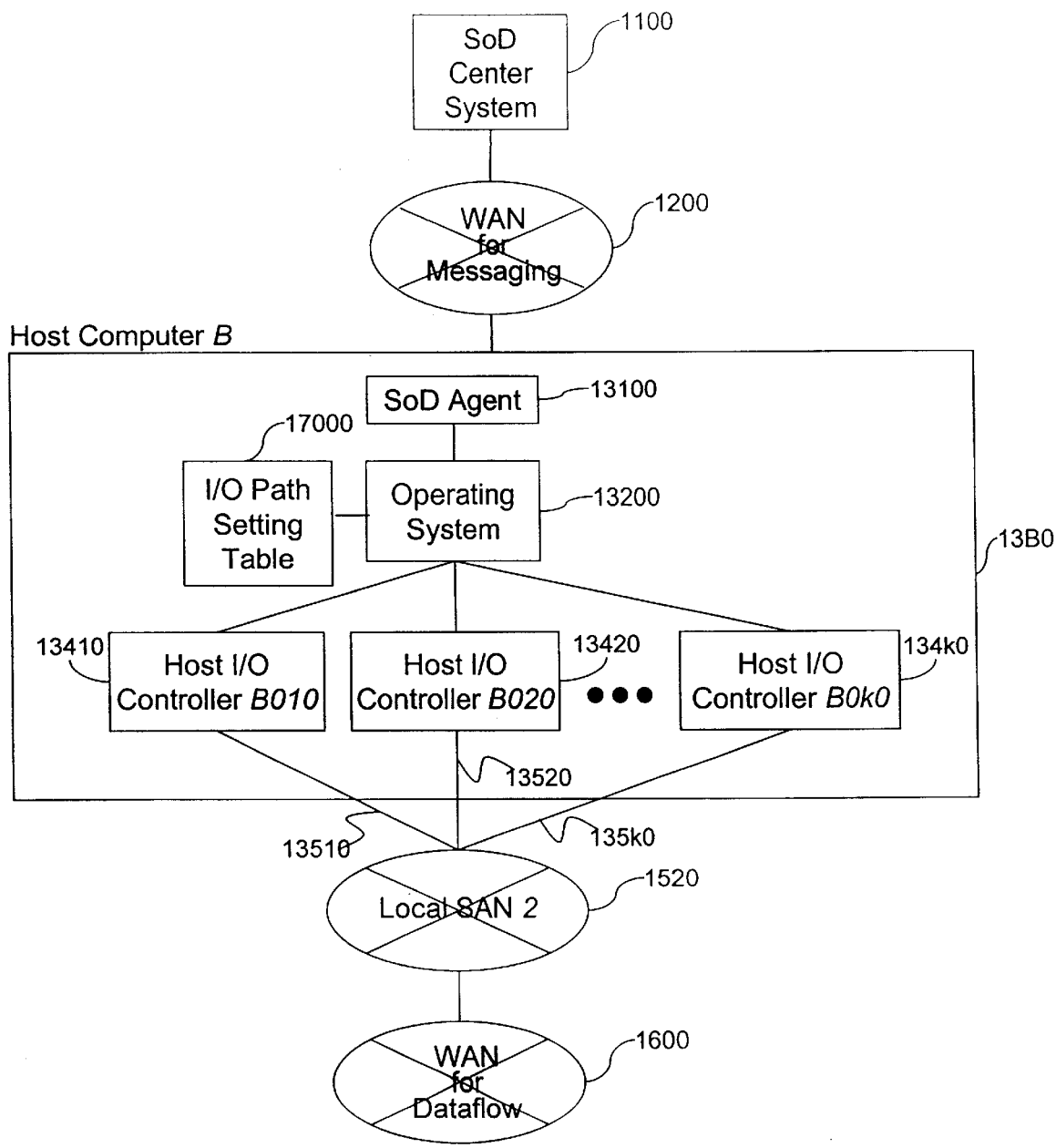
Fig. 2B: Configuration of Host Computer B (13B0)

Fig. 3A: Configuration of Storage Subsystem 11 (1411)
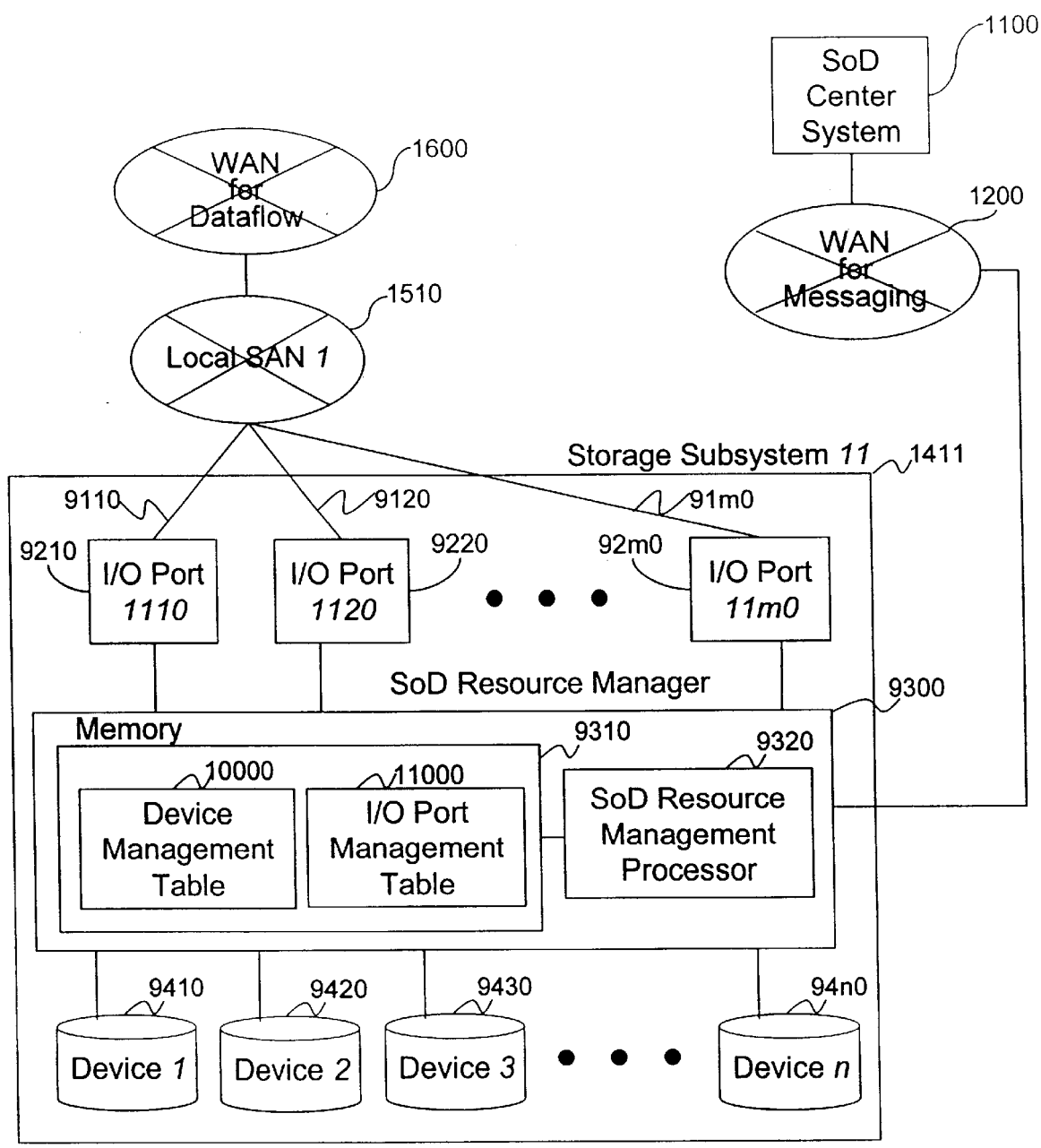

Fig. 3B: Configuration of Storage Subsystem 21 (1421)
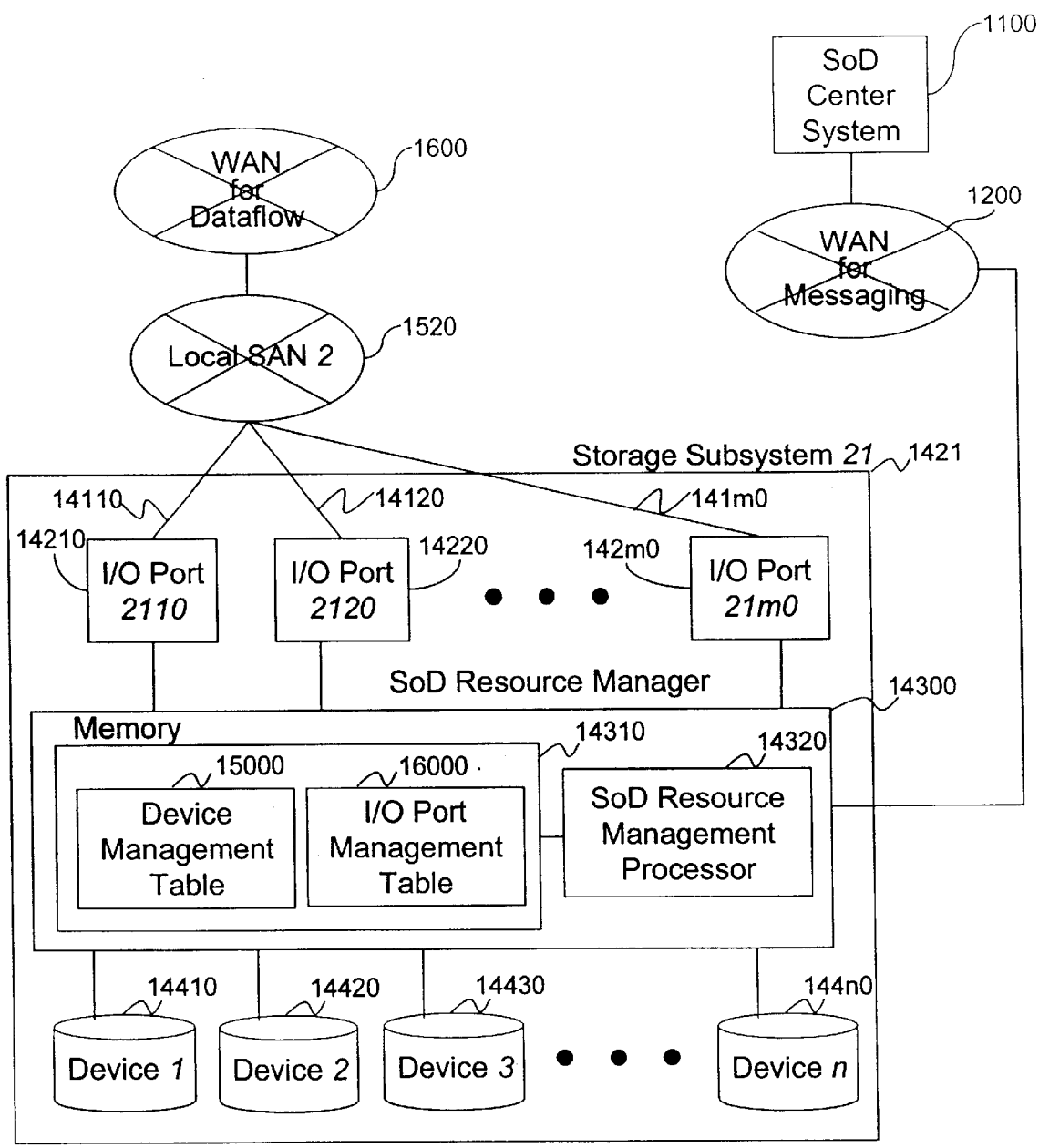

Fig. 4A: Device Management Table 10000
in Storage Subsystem 11 (1411)

| Device No. | Installation Status | SoD Status | Size |
|---|---|---|---|
| 1 | Installed | Usable | 500 GB |
| 2 | Installed | Usable | 500 GB |
| 3 | Installed | Usable | 250 GB |
| 4 | Installed | Usable | 250 GB |
| 5 | Installed | Usable | 500 GB |
| ⋮ | | | |
| n | Installed | Usable | 500 GB |

Fig. 5A: I/O Port Management Table 11000
in Storage Subsystem 11 (1411)

| I/O Port ID | Installation Status | SoD Status | Device No. |
|---|---|---|---|
| 1110 | Installed | Usable | 1, 2, 3 |
| 1120 | Installed | Usable | 4, 5, ···, n |
| 1130 | Installed | Un-Usable | N/A |
| ⋮ | | | |
| 11m0 | Installed | Un-Usable | N/A |

Fig. 4B: Device Management Table 15000
in Storage Subsystem 21 (1421) [Before SoD]

| Device No. | Installation Status | SoD Status | Size |
|---|---|---|---|
| 1 | Installed | Usable | 1000 GB |
| 2 | Installed | Usable | 1000 GB |
| 3 | Installed | Un-Usable | 1000 GB |
| 4 | Installed | Un-Usable | 1000 GB |
| 5 | Un-Installed | N/A | N/A |
| ⋮ | | | |
| n | Un-Installed | N/A | N/A |

Fig. 5B: I/O Port Management Table 16000
in Storage Subsystem 21 (1421) [Before SoD]

| I/O Port ID | Installation Status | SoD Status | Device No. |
|---|---|---|---|
| 2110 | Installed | Usable | 1, 2 |
| 2120 | Installed | Un-Usable | N/A |
| 2130 | Installed | Un-Usable | N/A |
| ⋮ | | | |
| 21m0 | Installed | Un-Usable | N/A |

Fig. 4C: Device Management Table 15000
in Storage Subsystem 21 (1421) [After SoD]

| Device No. | Installation Status | SoD Status | Size |
|---|---|---|---|
| 1 | Installed | Usable | 1000 GB |
| 2 | Installed | Usable | 1000 GB |
| 3 | Installed | Usable | 1000 GB |
| 4 | Installed | Usable | 1000 GB |
| 5 | Un-Installed | N/A | N/A |
| ⋮ | | | |
| n | Un-Installed | N/A | N/A |

Fig. 5C: I/O Port Management Table 16000
in Storage Subsystem 21 (1421) [After SoD]

| I/O Port ID | Installation Status | SoD Status | Device No. |
|---|---|---|---|
| 2110 | Installed | Usable | 1, 2 |
| 2120 | Installed | Usable | 3, 4 |
| 2130 | Installed | Un-Usable | N/A |
| ⋮ | | | |
| 210m | Installed | Un-Usable | N/A |

Fig. 6A: I/O Path Setting Table 12000
in Host Computer A (13A0) [Before SoD]

| I/O Path No. | Host I/O Controller ID | Subsystem No. | I/O Port ID |
|---|---|---|---|
| 1 | A010 | 11 | 1110 |
| 2 | A020 | 11 | 1120 |
| 3 | Un-Defined | N/A | N/A |
| 4 | Un-Defined | N/A | N/A |
| 5 | Un-Defined | N/A | N/A |
| 6 | Un-Defined | N/A | N/A |
| 7 | Un-Defined | N/A | N/A |

⋮

Fig. 6B: I/O Path Setting Table 17000
in Host Computer B (13B0) [Before SoD]

| I/O Path No. | Host I/O Controller ID | Subsystem No. | I/O Port ID |
|---|---|---|---|
| 1 | B010 | 21 | 2110 |
| 2 | Un-Defined | N/A | N/A |
| 3 | Un-Defined | N/A | N/A |
| 4 | Un-Defined | N/A | N/A |
| 5 | Un-Defined | N/A | N/A |
| 6 | Un-Defined | N/A | N/A |
| 7 | Un-Defined | N/A | N/A |

Fig. 6C: I/O Path Setting Table 12000
in Host Computer A (13A0) [After SoD]

| I/O Path No. | Host I/O Controller ID | Subsystem No. | I/O Port ID |
|---|---|---|---|
| 1 | A010 | 11 | 1110 |
| 2 | A020 | 11 | 1120 |
| 3 | A030 | 21 | 2120 |
| 4 | Un-Defined | N/A | N/A |
| 5 | Un-Defined | N/A | N/A |
| 6 | Un-Defined | N/A | N/A |
| 7 | Un-Defined | N/A | N/A |

Fig. 7: An Example of Host Computer Location Table 4000 in SoD Center System 1100

| Host Computer No. | Host Computer Location Data | |
|---|---|---|
| | Latitude | Longitude |
| A | 40° 00' 00" N | 130° 00' 00" E |
| B | 25° 00' 00" N | 170° 00' 00" E |
| C | 30° 00' 00" S | 110° 00' 00" W |

Fig. 8: An Example of Storage Subsystem Location Table 5000 in SoD Center System 1100

| Subsystem No. | Subsystem Location Data | |
|---|---|---|
| | Latitude | Longitude |
| 11 | 40° 00' 01" N | 130° 00' 01" E |
| 12 | 40° 00' 02" N | 130° 00' 02" E |
| 21 | 25° 00' 01" N | 170° 00' 01" E |
| 22 | 25° 00' 02" N | 170° 00' 02" E |
| 31 | 30° 00' 01" S | 110° 00' 01" W |
| 32 | 30° 00' 02" S | 110° 00' 02" W |

Fig. 9: Another Example of Host Computer Location Table 6000 in SoD Center System 1100

| Host Computer No. | Host Computer Location Data (IP Address) |
|---|---|
| A | 144.138.52.7 |
| B | 124.179.75.5 |
| C | 138.115.49.3 |

Fig. 10: Another Example of Storage Subsystem Location Table 7000 in SoD Center System 1100

| Subsystem No. | Subsystem Location Data (IP Address) |
|---|---|
| 11 | 144.138.52.8 |
| 12 | 144.138.52.9 |
| 21 | 124.179.75.6 |
| 22 | 124.179.75.7 |
| 31 | 138.115.49.4 |
| 32 | 138.115.49.5 |

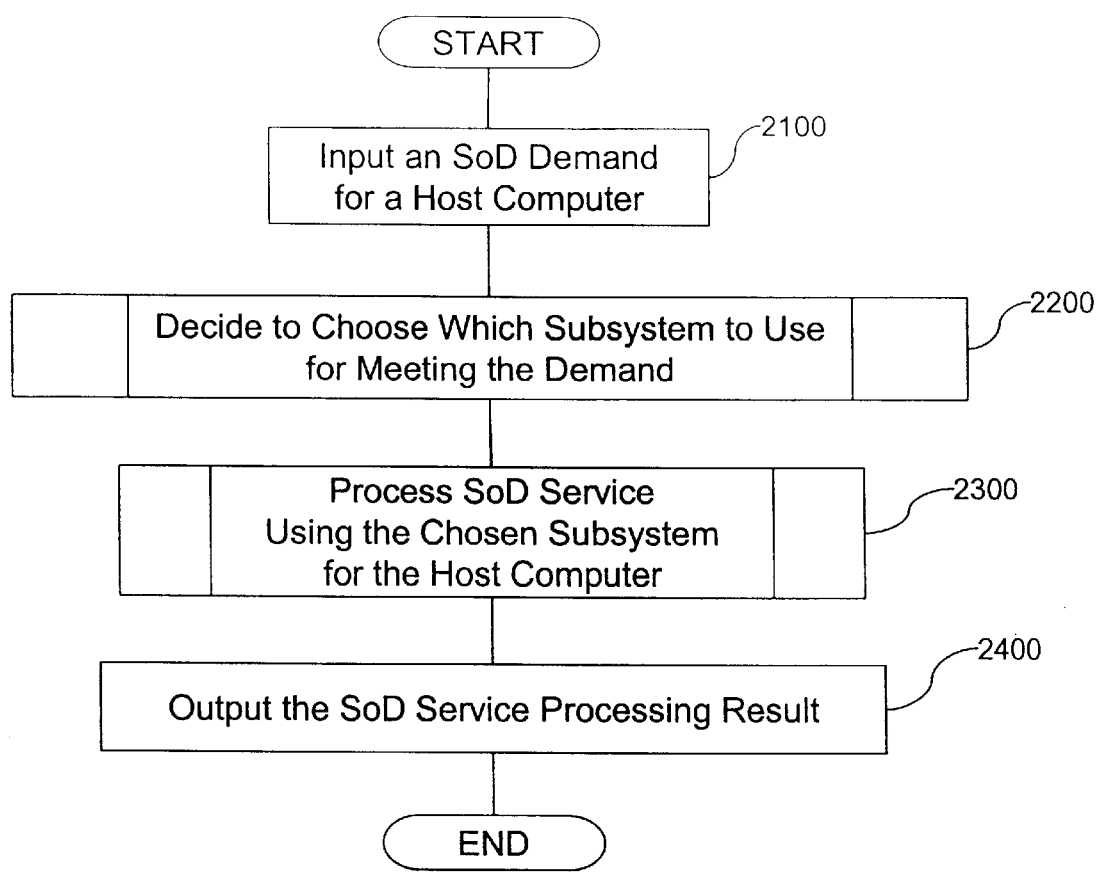
Fig. 11: General Processing Flow of SoD Center System

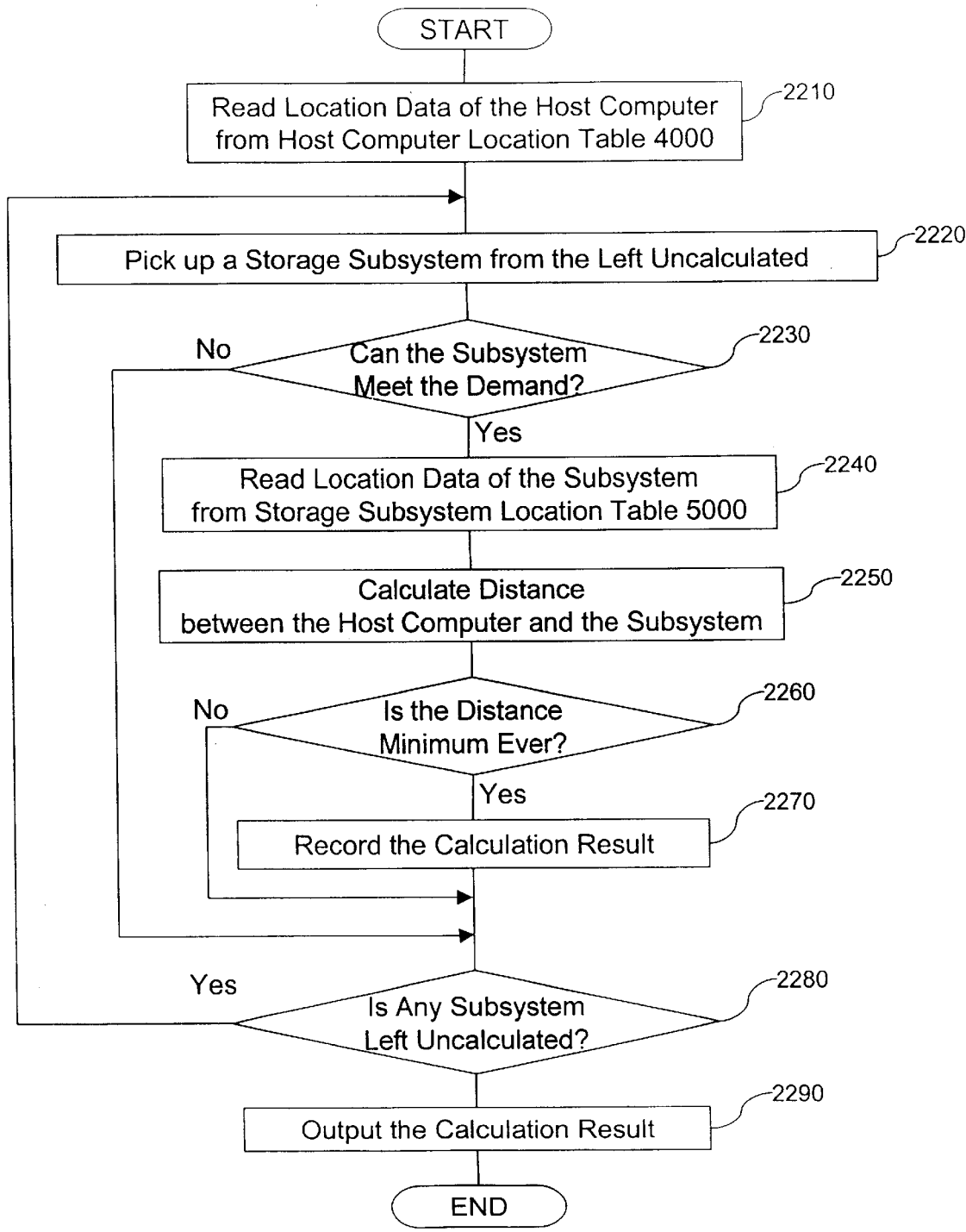
Fig. 12: An Example of Detailed Processing Flow of Step 2200

Fig. 13: An Example of Processing Flow of SoD Service Module 2300
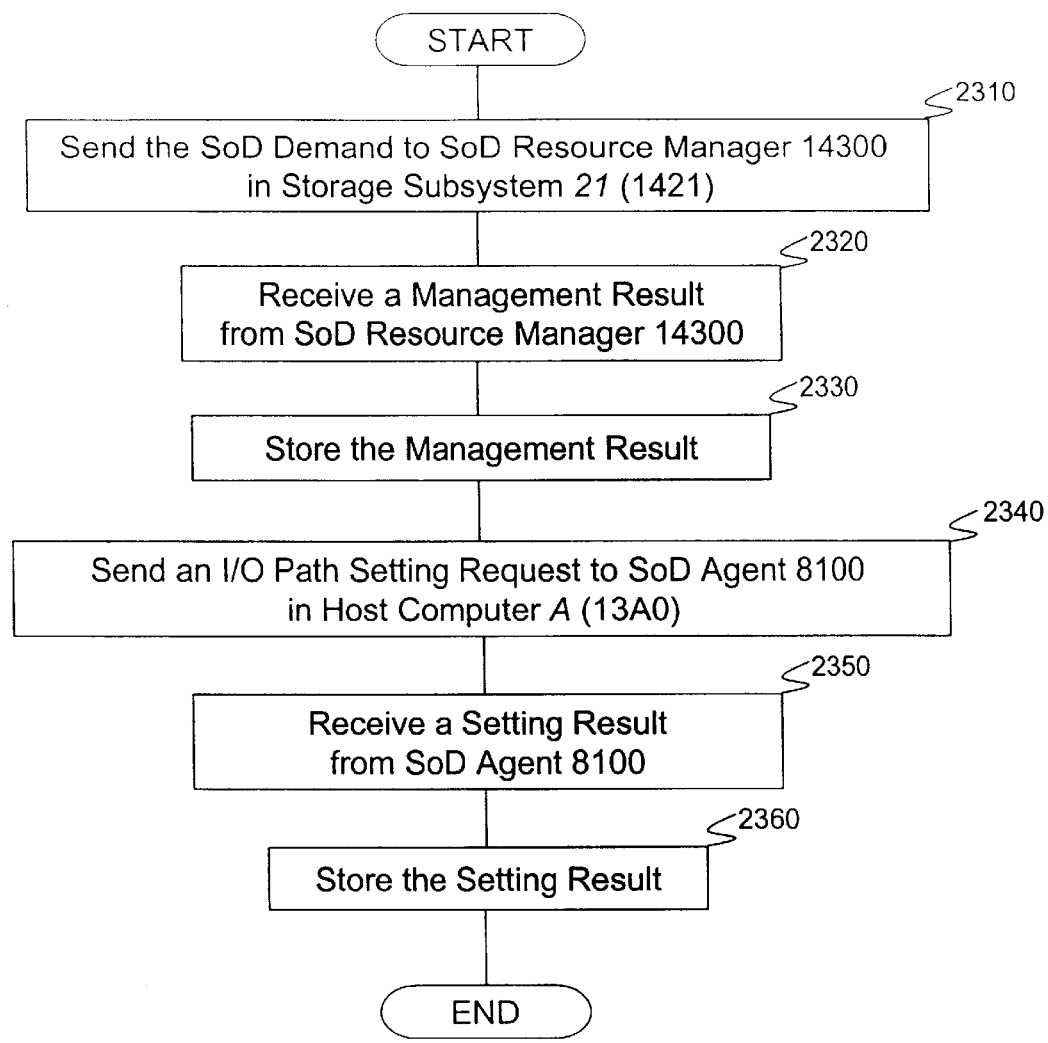

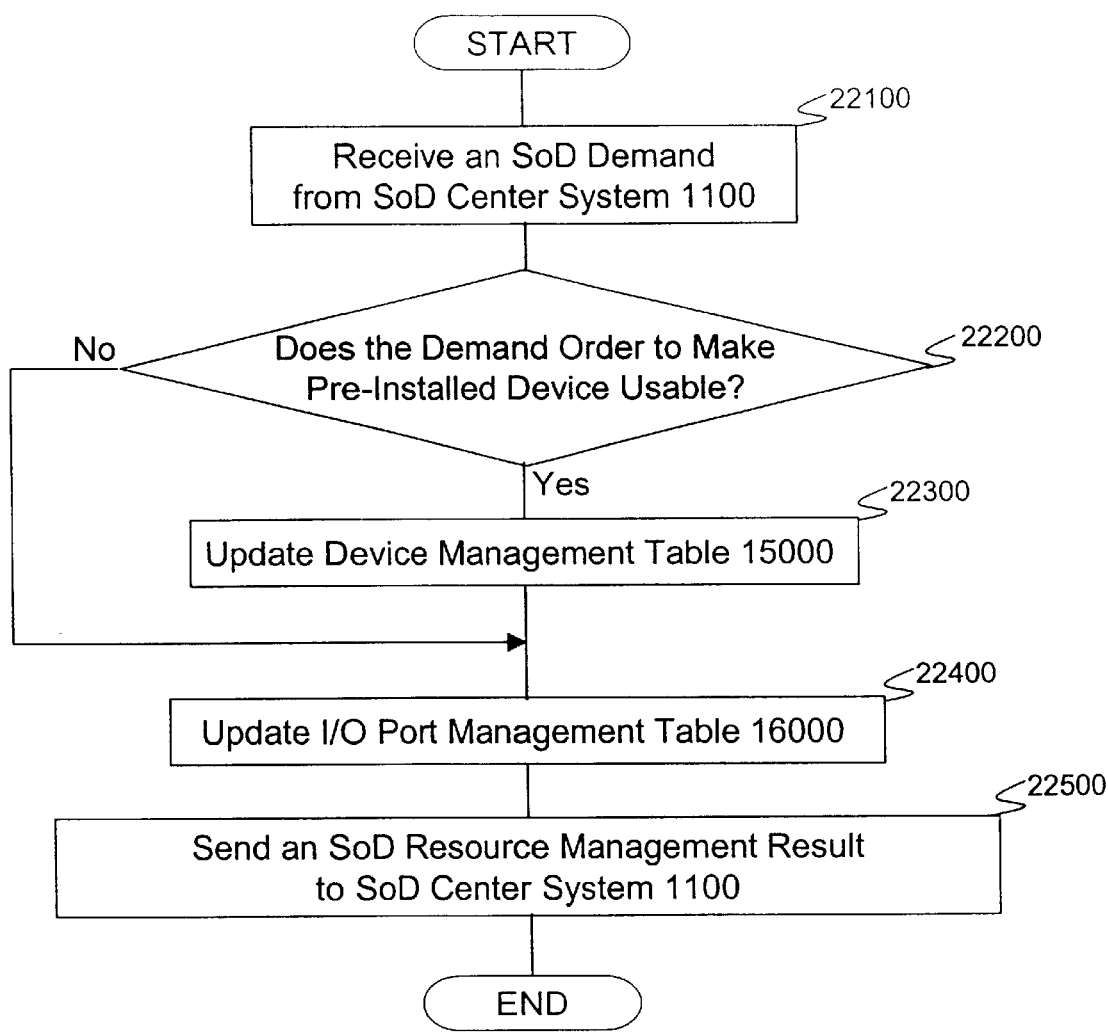
Fig. 14: Processing Flow of SoD Resource Manager 14300 in Storage Subsystem 21 (1421)
(Updating Resource Management Tables 15000 & 16000)

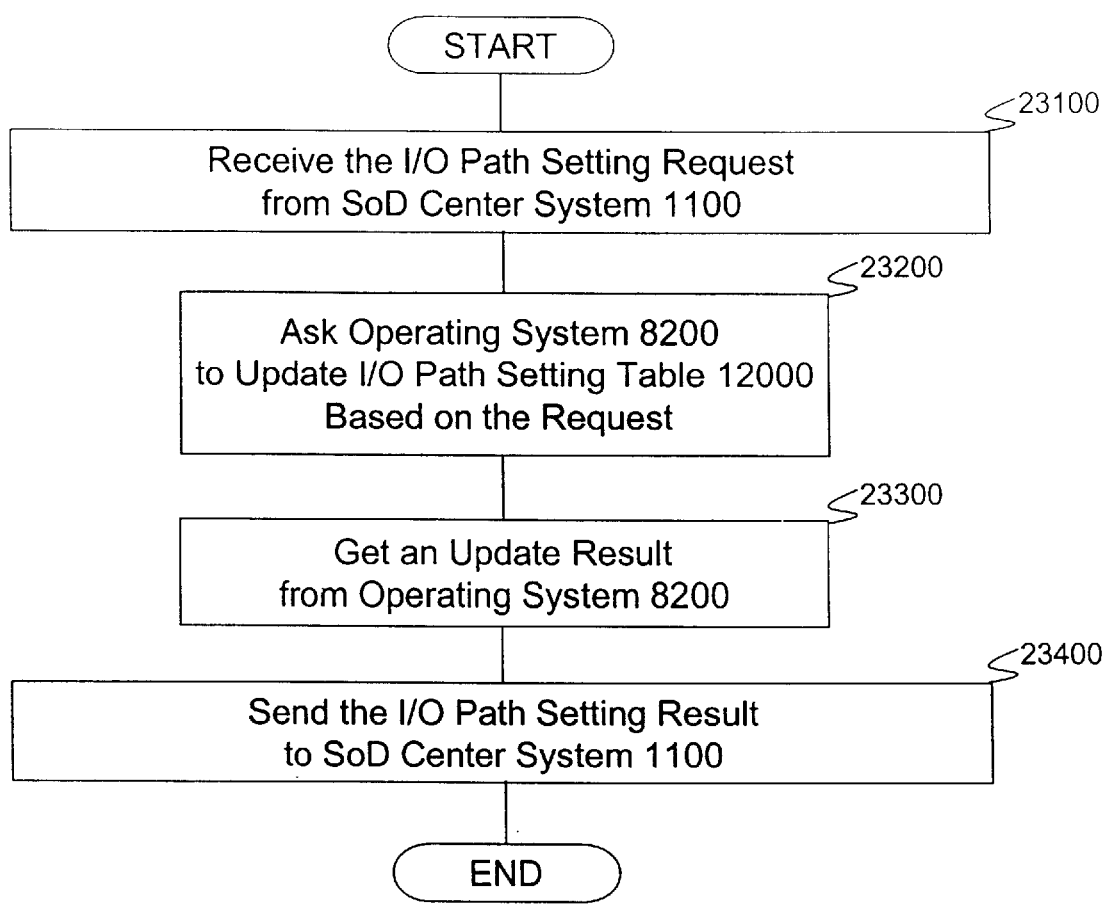
Fig. 15: Processing Flow of SoD Agent 8100 in Host Computer A (13A0)

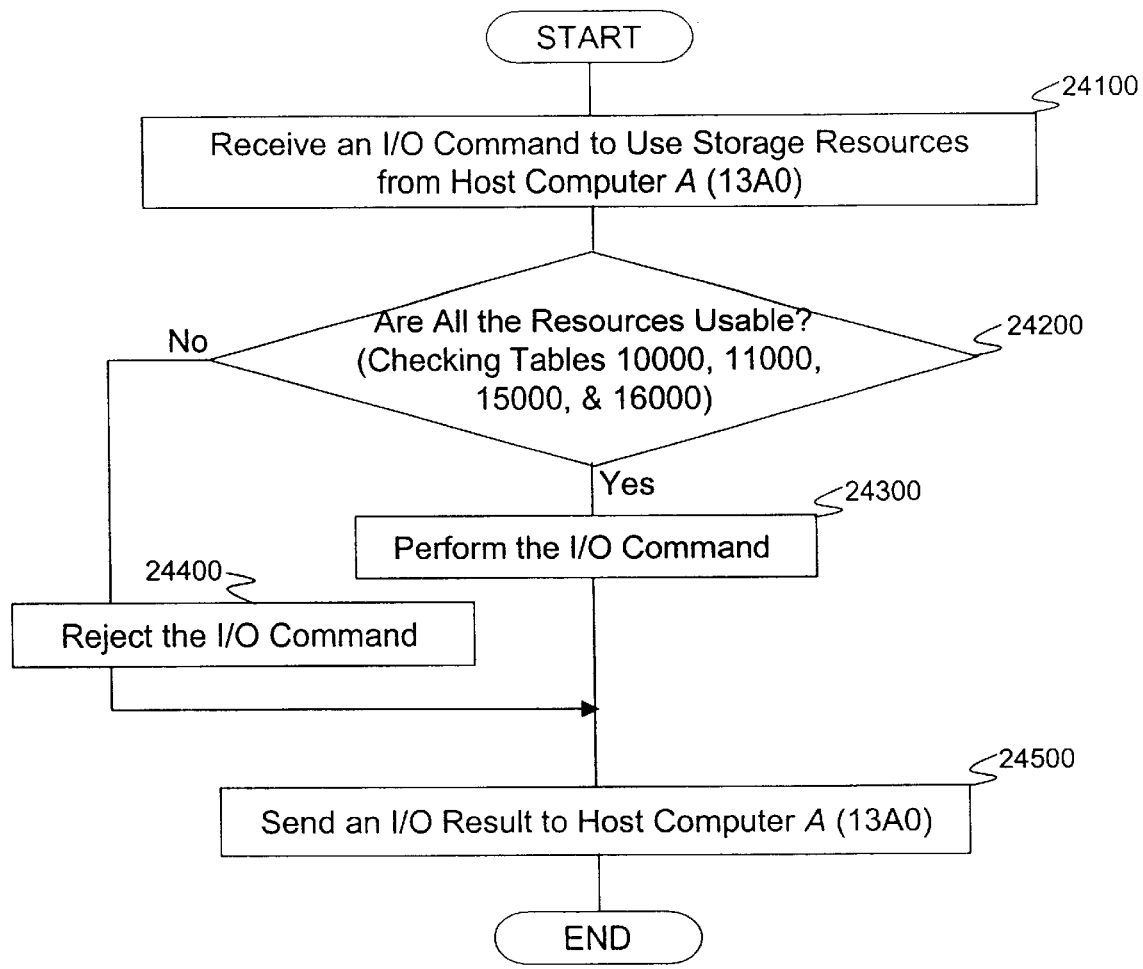
Fig. 16: Processing Flow of SoD Resource Manager 14300 in Storage Subsystem 21 (1421)
(Using Management Tables 10000, 11000, 15000, & 16000 to Manage Resources)

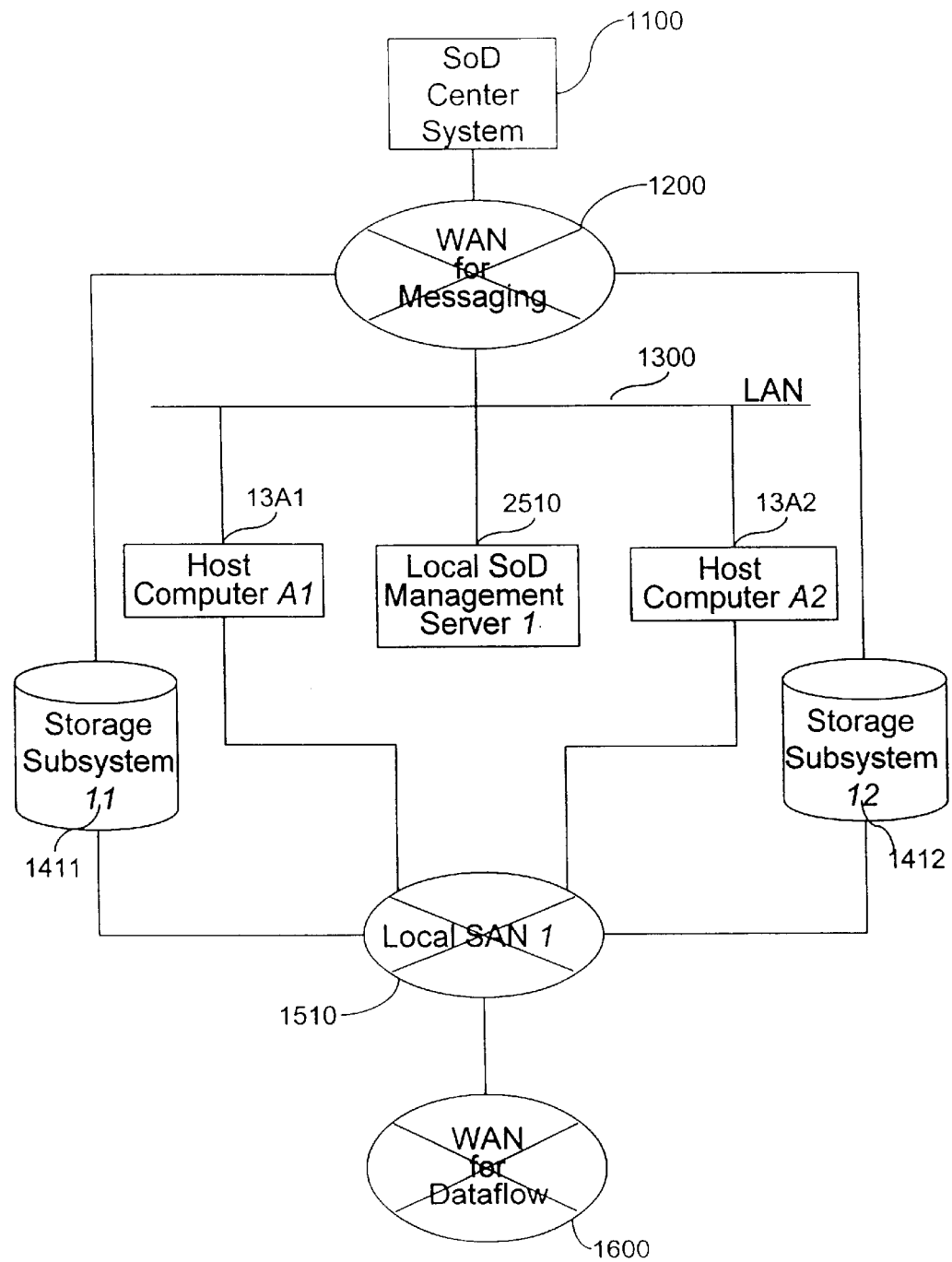
Fig. 17: Overall Configuration of SoD Service System with Local SoD Management Server in a Global SAN Environment Figure 18: Local SoD Management Server Table 26000 in SoD Center System 1100
| Local SoD Management Server | Address of Local SoD Management Server (IP Address) |
|---|---|
| 1 | 144.138.52.7 |
| 2 | 124.179.75.5 |
| 3 | 138.115.49.3 |
26100, 26200, 26000
Figure 19A: An Example of the Configuration of Local SoD Management Server 1 (2510)
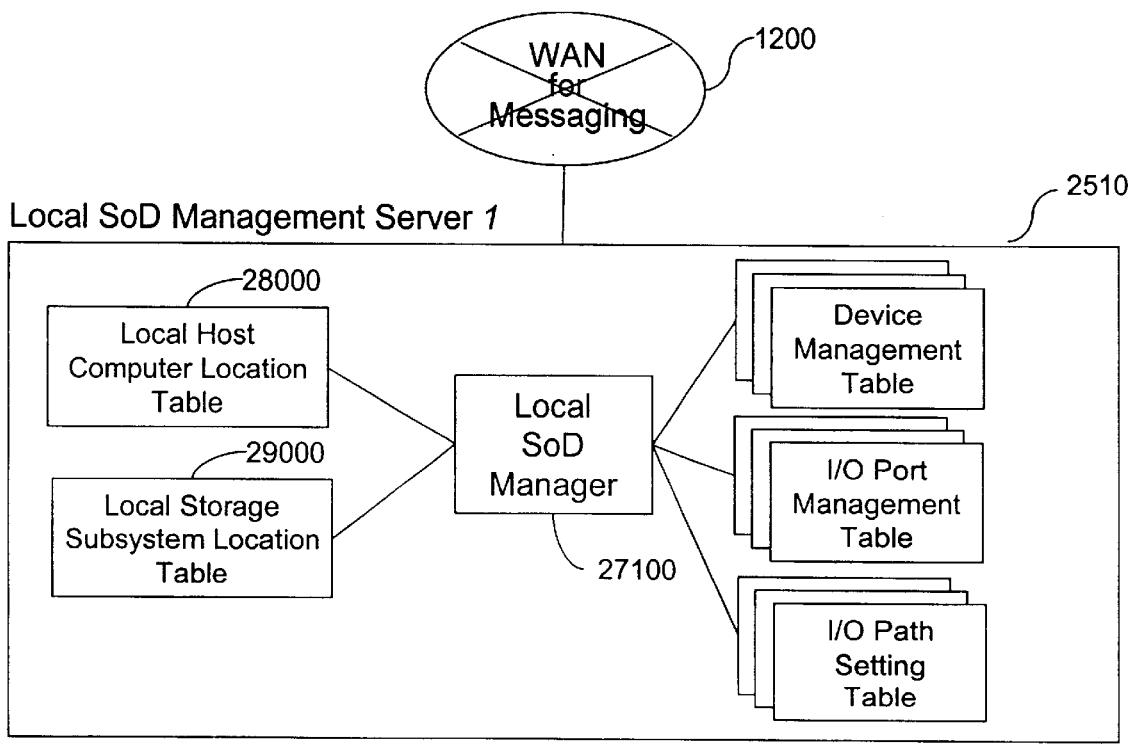

Figure 19B: Another Example of the Configuration of Local SoD Management Server1(2510)
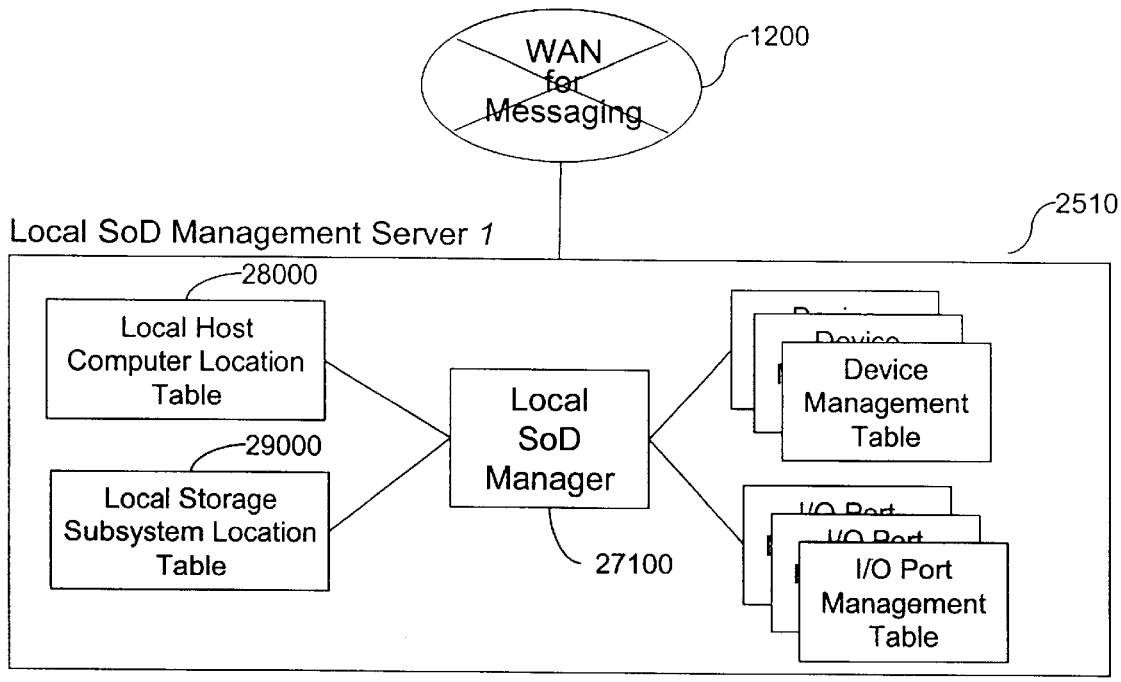
Figure 19C: Another Example of the Configuration of Local SoD Management Server1(2510)
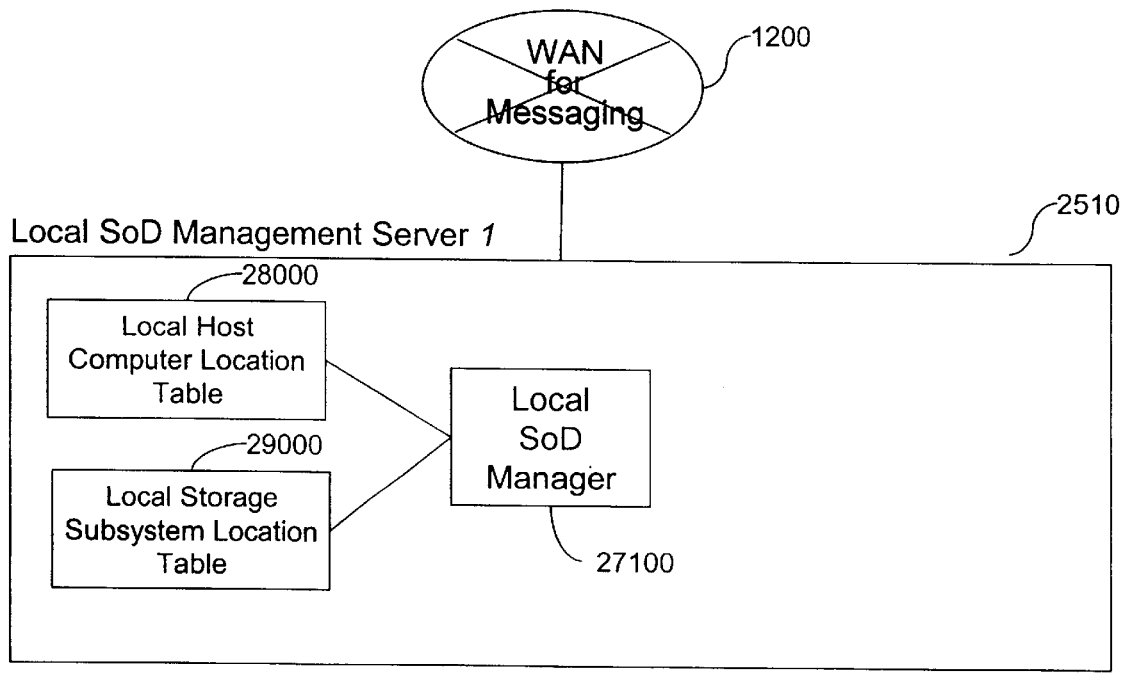

Fig. 20: An Example of Local Host Computer Location Table 28000 in Local SoD Management Server 1 (2510)

| Host Computer No. | Host Computer Location Data ||
|---|---|---|
| | Latitude | Longitude |
| A | 40° 00′ 00″ N | 130° 00′ 00″ E |
| B | 25° 00′ 00″ N | 170° 00′ 00″ E |
| C | 30° 00′ 00″ S | 110° 00′ 00″ W |

Fig. 21: An Example of Local Storage Subsystem Location Table 29000 in Local SoD Management Server 1 (2510)

| Subsystem No. | Subsystem Location Data ||
|---|---|---|
| | Latitude | Longitude |
| 11 | 40° 00′ 01″ N | 130° 00′ 01″ E |
| 12 | 40° 00′ 02″ N | 130° 00′ 02″ E |
| 21 | 25° 00′ 01″ N | 170° 00′ 01″ E |
| 22 | 25° 00′ 02″ N | 170° 00′ 02″ E |
| 31 | 30° 00′ 01″ S | 110° 00′ 01″ W |
| 32 | 30° 00′ 02″ S | 110° 00′ 02″ W |

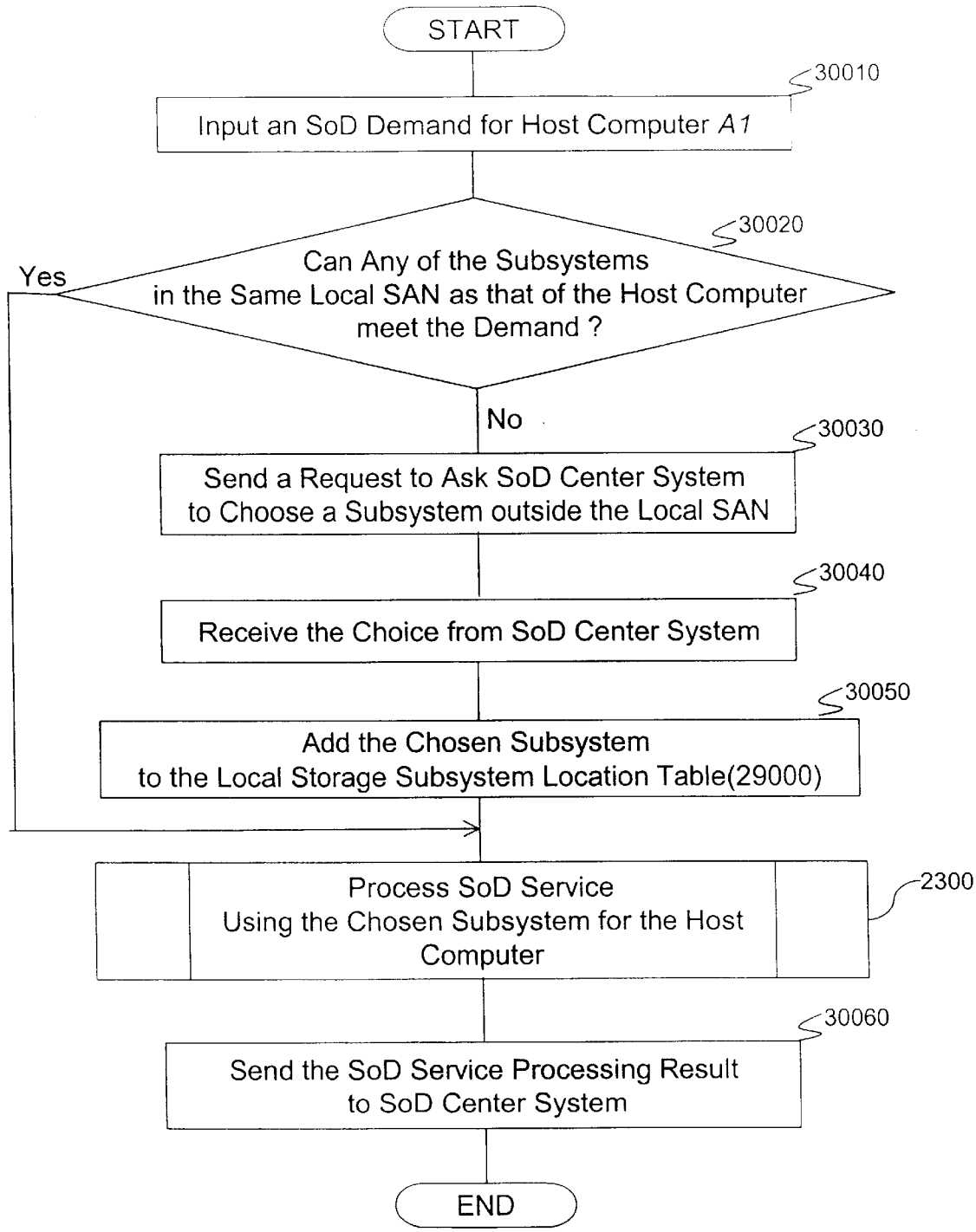
Figure 22: An Example of Processing Flow of Local SoD Manager 27100

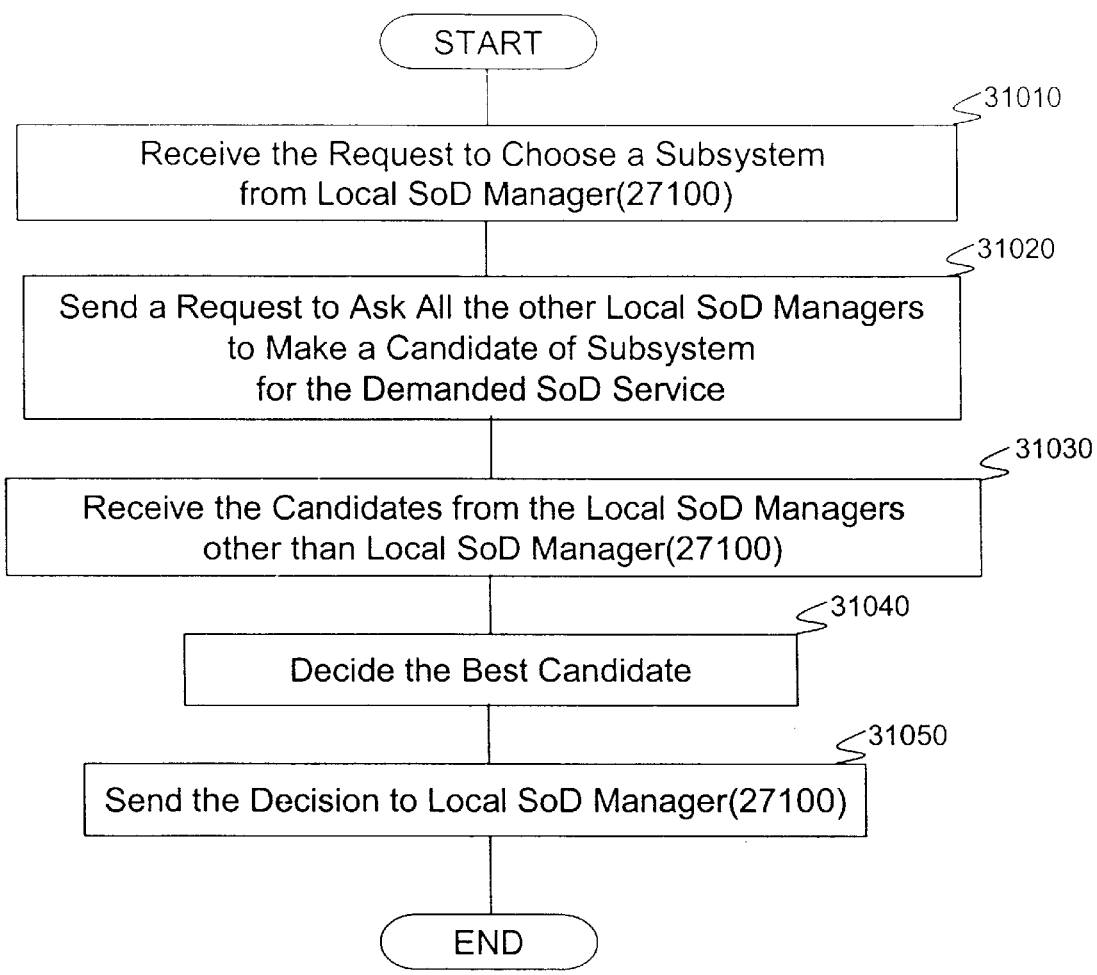
Fig. 23: An Example of Processing Flow of SoD Center System about which subsystem to choose for SoD demand

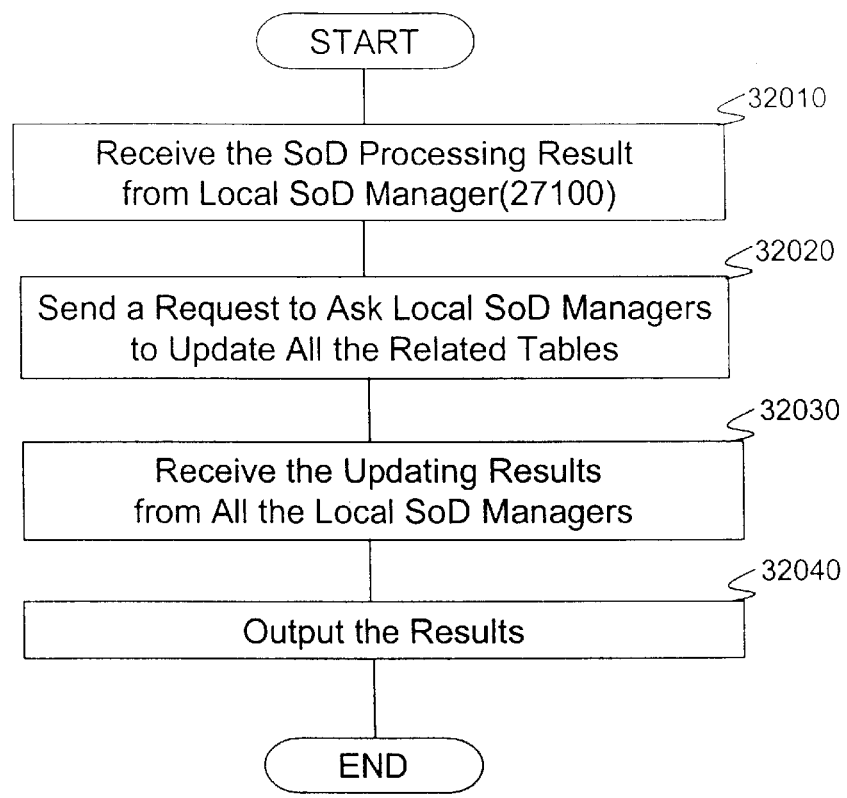
Fig. 24: An Example of Processing Flow of Requesting Local SoD Managers to Update Tables by SoD Center System

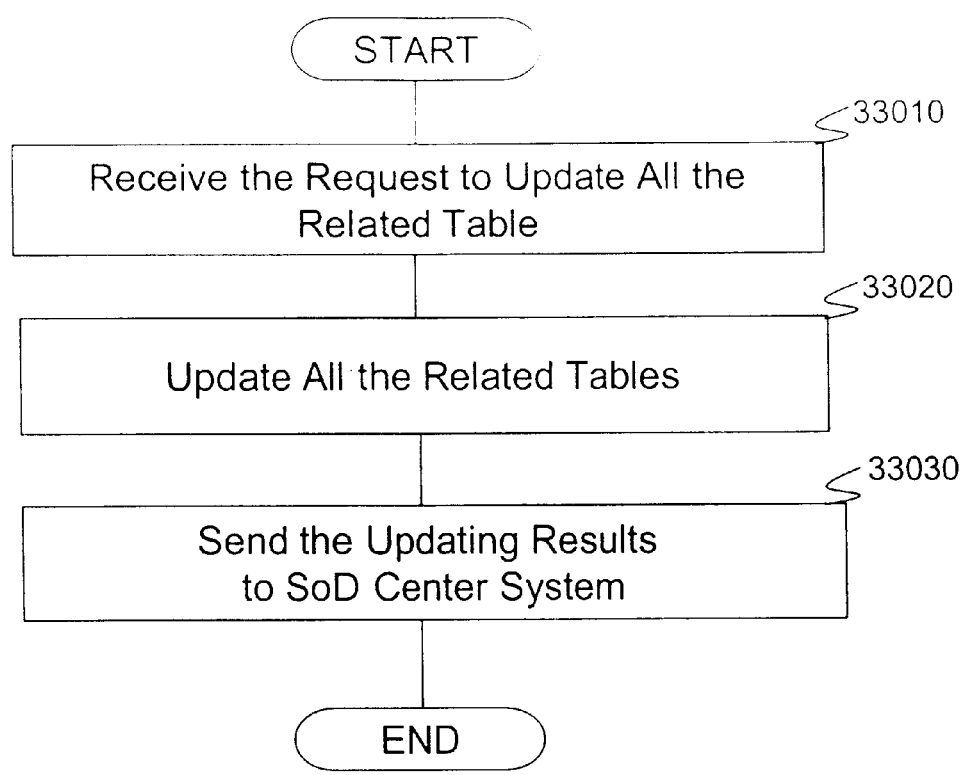
Fig. 25: An Example of Processing Flow of Updating All the Related Tables by Each Local SoD Manager

SYSTEM AND METHOD FOR STORAGE ON DEMAND SERVICE IN A GLOBAL SAN ENVIRONMENT

BACKGROUND OF THE INVENTION

The present invention relates generally to techniques for managing storage resources, and in particular to techniques for providing storage on demand management services.

The information technology revolution brings with it an ever increasing need for more storage capacity for business enterprises. It is expected that the average Fortune 1000 company's storage requirement will more than double in the coming years. In addition, growth has brought shortages of skilled persons in the information technology field. These challenges confront many companies facing the need to expand and improve their information technology assets. Increasingly, companies are turning to outsourcing storage management as a method of coping with the need to grow capacity in view of rapidly increasing demand. Storage on Demand (SoD) is one such service for providing storage management to business enterprises. By subscribing to an SoD service, companies can obtain needed storage resources by purchasing the services of the SoD service provider. Typical resources available through SoD service providers may include capacity (storage devices), I/O ports, and the like.

While certain advantages to present SoD technologies are perceived, opportunities for further improvement exist. For example, according to conventional SoD technology, storage resources located at one SoD site are unavailable for use by customer's using storage resources at another SoD site. Further, in conventional technologies, an SoD service provider must visit customer's sites to configure the customer's host computer installation to work with the SoD's storage resources. This can be a relatively time-consuming and costly process, especially in a situation where a substantial number of resources are managed. In other words, using conventional approaches, the resources of other SoD sites are unavailable to the customer who is serviced by a local SoD site that lacks capacity to fulfill the customer's requests.

What is needed are improved techniques for managing allocation of storage resources in a plurality of sites connected by a potentially widely dispersed network according to user demand.

SUMMARY OF THE INVENTION

The present invention provides improved techniques for managing storage resources, such as disk drives, I/O ports, and the like distributed among a plurality of sites according to user demand for these storage resources. In a specific embodiment, a local SoD system is capable of remotely activating installed storage resources in a remote storage subsystem responsive to customer demand. Specific embodiments provide the capability to select from among SoD sites a particular site capable of optimally satisfying a user's request. In various specific embodiments, optimal sites may be geographically closest to the user, shortest network routing from the user's site to the SoD site, and so forth. Specific embodiments provide users the capability to bring new resources on line, define pathways between resources at multiple dispersed sites, and the like, for example. Embodiments employ a software agent that obviates the need for system administrators to manually configure storage resources on a user's site.

In a representative embodiment according to the present invention, a storage management service system is provided. The system comprises a storage on demand (SoD) center system computer and a plurality of storage subsystems. Each storage subsystem has an SoD resource manager that manages storage resources of the storage subsystem. The system also includes a host computer. The host computer comprises a software agent that provides an interface between the SoD center system computer and an operating system resident on the host computer. The host computer, the plurality of storage subsystems, and the SoD center system computer are interconnected by a first communications network. This first communications network can be a local Storage Area Network (SAN), for example, in a specific embodiment. The host computer and at least one of the plurality of storage subsystems are interconnected by a second communications network, also. This second network may be a Wide Area Network (WAN) in specific embodiments, for example. The SoD center system computer receives input of a demand for storage resources for the host computer, and decides which of the plurality of storage subsystems to use to satisfy the demand. Then, the SoD center system sends the demand to a selected one of the plurality of storage subsystems. The SoD resource manager for the selected one of the storage subsystems receives the demand from the SoD center system computer, and thereupon updates a current status of at least one of a plurality of resources to reflect an allocation of the at least one of a plurality of resources to meet the demand. Then, the SoD resource manager sends a management result to the SoD center system computer. The SoD center system computer receives the management result from the SoD resource manager.

As used herein, the term "local SAN" can be broadly construed to comprise not only s a switched fabric network that occupies a relatively small area, and which has some Fibre Channel (FC) switches and operates without the need for an "extender" but also networks that provide much longer connection distances than a typical FC distance of 10 km. In a specific embodiment, the local SAN networks may be connected to each other in a wide area (i.e., "globally"), using some pairs of extenders, based on FC technologies, in order to create a "WAN for dataflow" network.

In a representative embodiment according to the present invention, a storage apparatus is provided. The storage apparatus comprises a memory; one or more devices that store information; one or more I/O ports providing an interface to the one or more devices that store information; a device management table, in which a status of the one or more devices that store information is stored, and an I/O port management table, in which a status of the one or more I/O ports is stored, the device management table and the I/O port management table being disposed in the memory. Further, the storage apparatus includes a storage resource management processor. The storage management processor receives a demand for storage resources, and thereupon updates the device management table and the I/O port management table and sends a management result responsive to the demand for storage resources. Further, the storage management processor makes updates to one or more paths connecting to storage resources allocated from the one or more devices that store information are automatically defined to an operating system of a remote host computer.

In a representative embodiment according to the present invention, a method for enabling a host computer to access storage resources is provided. The method is especially useful in an environment in which the host computer, one or more remote storage subsystems, and a center system computer interconnected by a first communication network. The method comprises receiving at the center system computer an input of a demand from the host computer for storage resources; determining a selected remote storage subsystem from the at least one of plurality of remote storage subsystems in which sufficient resources exist in order to meet the demand; processing the demand using the selected remote storage subsystem; and outputting a service processing result enabling the host computer to access storage resources.

In a specific embodiment, the determining a selected remote storage subsystem from the at least one of plurality of remote storage subsystems comprises reading a first location data for the host computer, and then, for each remote storage subsystem in the one or more remote storage subsystems, determining if the remote storage subsystem can satisfy the demand. If the remote storage subsystem can satisfy the demand, then reading a second location data for the remote storage subsystem, otherwise performing the determining for a next remote storage subsystem; computing a distance from the first location data and the second location data are performed in accordance with the method. If the distance is a minimum, then recording the distance as a calculation result is performed. If there are any remote storage subsystems remaining, performing the determining, reading, computing and recording for the remaining remote storage subsystems is performed according to the method. The method also includes outputting the calculation result.

In a specific embodiment, processing the demand using the selected remote storage subsystem comprises sending the demand for storage resources to the selected remote storage subsystem; receiving from the selected remote storage subsystem a management result, the management result indicating whether storage resources have been successfully allocated in accordance with the demand; storing the management result; sending the I/O path setting request to the host computer; receiving a setting result from the host computer; and storing the setting result.

In a representative embodiment according to the present invention, a method for configuring a remote storage subsystem to provide storage resources to a host computer is provided. The method is especially useful in an environment in which the host computer, one or more remote storage subsystems, and a center system computer interconnected by a first communication network. The method comprises receiving a demand for storage resources at the remote storage subsystem; determining whether the demand includes a command to make one or more installed devices available; updating a device management table, if the demand includes a command to make one or more installed devices available; updating an I/O port management table; and sending a resource management result to the center computer system.

In specific embodiments, updating a device management table comprises storing an indication that a particular device is usable, and/or updating a I/O port management table comprises storing an indication that a particular I/O port is usable.

In a specific embodiment, the method further comprises receiving at the storage subsystem an I/O command to access storage resources from the host computer; determining whether storage resources requested by the I/O command are usable; performing the I/O command, if the storage resources requested by the I/O command are usable, otherwise rejecting the I/O command; and sending an I/O result to the host computer.

In specific embodiments, determining whether storage resources requested by the I/O command are usable comprises searching the device management table to determine whether devices requested in the I/O command are usable, and/or searching the I/O port management table to determine whether I/O ports requested in the I/O command are usable and whether devices requested in the I/O command are accessible via I/O ports requested in the I/O command.

In a representative embodiment according to the present invention, a method for configuring a host computer to access resources in a remote storage subsystem is provided. The method is especially useful in an environment in which the host computer, one or more remote storage subsystems, and a center system computer interconnected by a first communication network. The method comprises receiving at the host computer an I/O path setting request from the center system computer, the I/O path setting request comprising information about resources in the remote storage subsystem allocated for use by the host computer; requesting an operating system resident in the host computer to update an I/O path setting table based upon the I/O path setting request; receiving an update result from the operating system; and sending a setting result to the center system computer based upon the update result.

In a specific embodiment, the updating of the I/O path setting table comprises storing an indication that a particular I/O port in the storage subsystem is accessible to a particular host I/O controller.

Specific embodiments enable management of storage resources that are distributed world wide. In a specific embodiment, a local SAN manager is incorporated into each local SAN. Accordingly, in this specific embodiment, if the local SAN manager provides SoD service in the local area, services can be provided with greater efficiency.

In a representative embodiment according to the present invention, a method for enabling a host computer to access storage resources is provided. The method is especially useful in an environment in which the host computer and a local management server are interconnected by a first communication network, and a center system computer and one or more local storage subsystems are interconnected to the first communication network via a second communication network. Further, one or more of remote storage subsystems, external to the first communication network, are interconnected by the second communication network. The method comprises receiving at the local management server an input of a demand from the host computer for storage resources; determining whether any of the one or more local storage subsystems can meet the demand, and if one of the one or more local storage subsystems can meet the demand, selecting the local storage subsystem as a selected storage subsystem. If none of the one or more local storage subsystems can meet the demand, sending a request to the center system computer to select a remote storage subsystem from the one or more remote storage subsystems external to the first communication network, in which sufficient resources exist in order to meet the demand is performed according to the method. Further, the method includes receiving a selection of a remote storage subsystem as a selected storage subsystem from the center system computer; processing the demand using the selected storage subsystem; and outputting a service processing result enabling the host computer to access storage resources in the selected storage subsystem.

In a specific embodiment, processing the demand using the selected storage subsystem comprises sending the demand for storage resources to the selected storage subsystem; receiving from the selected storage subsystem a management result, the management result indicating whether storage resources have been successfully allocated in accordance with the demand; storing the management result; sending the I/O path setting request to the host computer; receiving a setting result from the host computer; and storing the setting result.

In a representative embodiment according to the present invention, a method for enabling a host computer to access storage resources is provided. The method is especially useful in an environment in which the host computer and a local management server are interconnected by a first communication network, and a center system computer and one or more local storage subsystems are interconnected to the first communication network via a second communication network. Further, one or more of remote storage subsystems, external to the first communication network, are interconnected by the second communication network. The method comprises receiving at the center system computer a request from the local management server to select one of the one or more remote storage subsystems; sending a request to determine candidates from among the one or more remote storage subsystems to the one or more other local management servers, the candidates having sufficient resources in order to meet the demand; and receiving at the center system computer one or more candidates from the one or more other local management servers. Further, the method includes determining a selected remote storage subsystem from among the at least one of plurality of candidates received from the one or more other local management servers; determining a selected remote storage subsystem from among the one or more candidates; and sending to the local management server the selected remote storage subsystem, enabling the host computer to access storage resources.

In a specific embodiment, the method can also include receiving at the center system computer a service processing result from the local management server; sending a request to update tables to the local management server and the one or more other local management servers; receiving at the center system computer one or more updating results from the one or more other local management servers; and providing as output the one or more updating results.

In a representative embodiment according to the present invention, a method for enabling a host computer to access storage resources is provided. The method is especially useful in an environment in which the host computer and a local management server are interconnected by a first communication network, and a center system computer and one or more local storage subsystems are interconnected to the first communication network via a second communication network. Further, one or more of remote storage subsystems, external to the first communication network, are interconnected by the second communication network. The method comprises receiving at the local management server and the one or more other local management servers a request to update tables to reflect an allocation of resources in the one or more remote storage subsystems to the host computer; updating tables in accordance with the request; and sending to the center system computer an updating result.

In a specific embodiment, the tables can be a table of host computer locations comprising a longitude and a latitude, and/or a table of storage subsystem locations comprising a longitude and a latitude.

Numerous benefits are achieved by way of the present invention over conventional techniques. Specific embodiments provide users with the capability to bring new resources on line, define pathways between resources, and the like, for example. Embodiments can obviate the need for system programmers from an SoD service provider to manually configure storage resources on a user's site. Specific embodiments can provide storage resources to users at reduced cost.

These and other benefits are described throughout the present specification. A further understanding of the nature and advantages of the invention herein may be realized by reference to the remaining portions of the specification and the attached drawings.

BRIEF DESCRIPTION OF THE DRAWINGS

FIG. 1 illustrates a diagram of a representative system for embodying a centralized SoD service in a global SAN environment in a specific embodiment of the present invention.

FIGS. 2A and 2B illustrate representative configurations for host computers in a specific embodiment of the present invention.

FIGS. 3A and 3B illustrate representative configurations for storage subsystems in a specific embodiment of the present invention.

FIGS. 4A–4C illustrate representative device management tables in a specific embodiment of the present invention.

FIGS. 5A–5C illustrate representative I/O port management tables in a specific embodiment of the present invention.

FIGS. 6A–6C illustrate representative I/O path setting tables in a specific embodiment of the present invention.

FIG. 7 illustrates a representative host computer location table in a specific embodiment of the present invention.

FIG. 8 illustrates a representative subsystem location table in a specific embodiment of the present invention.

FIG. 9 illustrates a representative host computer location table in another specific embodiment of the present invention.

FIG. 10 illustrates a representative subsystem location table in another specific embodiment of the present invention.

FIG. 11 illustrates a flowchart of a representative processing flow in another specific embodiment of the present invention.

FIG. 12 illustrates a flowchart of a representative processing for selecting a subsystem in a specific embodiment of the present invention.

FIG. 13 illustrates a flowchart of representative SoD service module processing in an SoD center system in a specific embodiment according to the present invention.

FIG. 14 illustrates a flowchart of representative SoD resource manager processing in a specific embodiment according to the present invention.

FIG. 15 illustrates a flowchart of representative SoD agent processing in a specific embodiment according to the present invention.

FIG. 16 illustrates a flowchart of representative SoD resource manager processing for a storage access request in a specific embodiment according to the present invention.

FIG. 17 illustrates a diagram of a representative system for embodying a centralized SoD service in a global SAN environment in another specific embodiment of the present invention.

FIG. 18 illustrates a representative local SoD management server table in a specific embodiment of the present invention.

FIGS. 19A–19C illustrate diagrams of representative local SoD management server in a various specific embodiments of the present invention.

FIG. 20 illustrates a representative local host computer location table in a specific embodiment of the present invention.

FIG. 21 illustrates a representative local storage subsystem location table in a specific embodiment of the present invention.

FIG. 22 illustrates a flowchart of representative local SoD manager processing in a specific embodiment according to the present invention.

FIG. 23 illustrates a flowchart of representative SoD center system processing in a specific embodiment according to the present invention.

FIG. 24 illustrates a flowchart of representative SoD center system processing in a specific embodiment according to the present invention.

FIG. 25 illustrates a flowchart of representative local SoD manager processing in a specific embodiment according to the present invention.

DESCRIPTION OF THE SPECIFIC EMBODIMENTS

The present invention provides improved techniques for managing storage resources, such as disk drives, I/O ports, and the like distributed among a plurality of sites according to user demand for these storage resources. Specific embodiments provide users the capability to bring new resources on line, define pathways between resources, and the like. Embodiments can obviate the need for system programmers to manually configure storage resources at a user's site.

FIG. 1 illustrates a diagram of a representative system for embodying a centralized SoD service in a global SAN environment in a specific embodiment of the present invention. As illustrated in FIG. 1, the SoD service system includes an SoD center system (1100) linked via a Wide Area Network (WAN) for messaging (1200) with a plurality of storage subsystems 11 (1411), 12 (1412), 21 (1421), 22 (1422), 31 (1431) and 32 (1432) and a plurality of host computers A (13A0), B (13B0), and C (13C0). These subsystems and the computers are connected to each other via a global data network comprised of local SAN 1 (1510), local SAN 2 (1520), and local SAN 3 (1530), as well as a WAN for dataflow (1600).

The SoD center system (1100) includes a computer connected to an input device, an output device, a storage device, and a communications line connected to WAN for messaging (1200). The input device is a combination of a keyboard and a mouse. The output device is a display. The storage device may be a magnetic disk, an optical disk, a magnetic-optical disk, or a semiconductor memory in various specific embodiments. This device has sufficient storage capacity to store within it files for execution of programs and an accompanying amount of data. In a specific embodiment, the communications line is capable of a high-speed communications. In specific embodiments, the SoD center system (1100) is implemented using a general purpose computer system. In various specific embodiments, the WAN for messaging (1200) can be the Internet, another wide area network comprised of private communications lines, or a combination of both. The SoD center system (1100) further comprises a processor that executes instructions, which are embodied in the form of program code and reside in a memory which is connected to the processor by a system bus. In a specific embodiment, an SoD processing program 2000 is disposed in the memory of the SoD center system (1100). Further, a host computer location table 4000 and a storage subsystem location table 5000, or a host computer location table 6000 and a storage subsystem location table 7000 may be disposed within the memory of the SoD center system (1100).

In various specific embodiments, the topologies of the local SAN 1 (1510), SAN 2 (1520), and SAN 3 (1530) can be point-to-point, arbitrated loop, or fabrics. As used herein, the term "Fabrics" is intended to be broadly construed to enable a class of Fibre Channel SAN topologies in which a Fibre Channel fabric comprising one or more fabric switches integrated into a single, sometimes extended, configuration. Fibre channel (FC) is one protocol used in a presently preferred embodiment, however, other protocols can also be used for the local SANs in various other specific embodiments. The WAN for dataflow (1600) employs a fibre channel (FC) protocol in a presently preferred embodiment. However, other protocols may be used for the WAN for dataflow (1600), such as the Internet Protocol (IP), in various other specific embodiments. Thus, the Internet can be used both for WAN for messaging (1200) and for WAN for dataflow (1600) at the same time in a specific embodiment.

FIGS. 2A and 2B illustrate representative configurations for host computers in a specific embodiment of the present invention. As shown by FIG. 2A, a representative host computer A (13A0), and as shown by FIG. 2B, a representative host computer B (13B0), comprise similar configurations in a specific embodiment. The host computer C (13C0), though not illustrated, is similarly configured to the host computer A (13A0) and the host computer B (13B0). Host computer A (13A0) comprises at least one port to communicate with SoD center system (1100) via the WAN for Messaging (1200). Further, the host computer A (13A0) comprises one or more host I/O controller(s), or host bus adapter(s), A010 (8410), A020 (8420), through A0k0 (84k0), which are connected to local SAN 1 (1510) by means of connections 8510, 8520, through 85k0. Local SAN 1 (1510) provides connection to WAN for dataflow (1600). Host computer A (13A0) further comprises an SoD agent (8100) that can run under an operating system (8200). Operating system (8200) controls the operation of the host I/O controllers (8410 through 84k0) using an I/O path setting table (12000). The I/O path setting table (12000) includes information about I/O paths through the host I/O controllers, host computer and other system components.

FIG. 2B illustrates representative host computer B (13B0) in a specific embodiment of the present invention. As shown by FIG. 2B, host computer (13B0) is similarly configured, comprising one or more ports to communicate with SoD center system (1100) via the WAN for Messaging (1200). Further, the host computer B (13B0) comprises one or more host I/O controller(s), or host bus adapter(s), B010 (13410), B020 (13420), through B0k0 (134k0), which are connected to local SAN 2 (1520) by means of connections 13510, 13520, through 135k0. Local SAN 2 (1520) provides connection to WAN for dataflow (1600). Host computer B (13B0) further comprises an SoD agent (13100) that can run under an operating system (13200). Operating system (13200) controls the operation of the host I/O controllers (13410 through 134k0) using an I/O path setting table (17000). The I/O path setting table (17000) includes information about I/O paths through the host I/O controllers, host computer and other system components.

FIGS. 3A and 3B illustrate representative configurations for storage subsystems in a specific embodiment of the present invention. As shown by FIG. 3A, a representative storage subsystem 11 (1411), and as shown by FIG. 3B, a representative storage subsystem 21 (1421) comprise similar configurations in a specific embodiment. The storage subsystem 31 (1431), though not illustrated, is similarly configured to the storage subsystem 11 (1411) and the storage subsystem 21 (1421) in a specific embodiment. The storage subsystem 11 (1411) comprises one or more I/O port(s), including I/O port 1110 (9210), I/O port 1120 (9220), through I/O port 11m0 (92m0). The I/O ports are connected to the local SAN 1 (1510) by a plurality of connections 9110 through 91m0. Further, local SAN 1 is connected to WAN for Dataflow (1600). Further, the I/O ports provide connectivity to a plurality of storage devices, including a device 1 (9410), a device 2 (9420), a device 3 (9430), through a device n (94n0) via an SoD resource manager (9300), which manages storage resources in the storage subsystem 11 (1411). The resource manager (9300) is comprised of an SoD resource management processor (9320) and a memory (9310). Memory 9310 further comprises a device management table (10000) and an I/O port management table (11000). The resource manager (9300) can also communicate with SoD center system (1100) via WAN for messaging (1200).

FIG. 3B illustrates representative storage subsystem 21 (1421) in a specific embodiment of the present invention. As shown by FIG. 3B, the storage subsystem 21 (1421) comprises one or more I/O port(s), including I/O port 2110 (14210), I/O port 2120 (14220), through I/O port 21m0 (142m0). The I/O ports are connected to the local SAN 2 (1520) by a plurality of connections 14110, 14120, through 141m0. Further, local SAN 2 is connected to WAN for dataflow (1600). Further, the I/O ports provide connectivity to a plurality of storage devices, including a device 1 (14410), a device 2 (14420), a device 3 (14430), through a device n (144n0) via an SoD resource manager (14300), which manages storage resources in the storage subsystem 21 (1421). The resource manager (14300) is comprised of an SoD resource management processor (14320) and a memory (14310). Memory 14310 further comprises a device management table (15000) and an I/O port management table (16000). The resource manager (14300) can also communicate with SoD center system (1100) via WAN for messaging (1200). The other of storage subsystems 11 (1411), 12 (1412), 21 (1421), 22 (1422), 31 (1431) and 32 (1432) may be of similar configuration to the storage subsystems described with reference to FIGS. 3A and 3B.

FIGS. 4A, 4B and 4C illustrate representative device management tables in a specific embodiment of the present invention. As shown by FIG. 4A, a representative device management table 10000 is used in storage subsystem 11 (1411) in a specific embodiment. Device management table 10000 comprises a plurality of columns, including a device number (10100), an installation status (10200), an SoD status (10300), and a size (10400). In the representative example embodiment illustrated by FIG. 4A, entries exist for device number 1 (9410) through device number n (94n0). As indicated by the entries under the installation status 10200 in table 10000, device number 1 (9410) through device number n (94n0) are installed. Further, as indicated by the entries under the SoD status 10300 in table 10000, device number 1 (9410) through device number n (94n0) are usable as currently configured in FIG. 4A.

As shown by FIG. 4B, a representative device management table 15000 is used in storage subsystem 21 (1421) in a specific embodiment. Device management table 15000 comprises a plurality of columns, including a device number (15100), an installation status (15200), an SoD status (15300), and a size (15400). In the representative example embodiment illustrated by FIG. 4B, entries exist for device number 1 (14410) through device number n (144n0). As indicated by the entries under the installation status 15200 in table 15000, device number 1 (14410) through device number 4 (14440) are installed, however device number 5 (14450) through device number n (144n0) are not installed. Further, as indicated by the entries under the SoD status 15300 in table 15000, device number 1 (14410) through device number 2 (14420) are usable as. Device number 3 (14430) through device number 4 (14440) are not usable. Device number 5 (14450) through device number n (144n0) are not installed, so therefore, the usable column does not contain meaningful information for these device currently configured in FIG. 4B.

FIG. 4C illustrates the representative device management table 15000 of FIG. 4B after a demand to allocate an additional storage capacity in storage subsystem 21 (1421) is processed in a specific embodiment. In an example situation in which the host computer A (13A0) has been allocated storage subsystem 11 (1411). All storage devices of storage subsystem 11 (1411) are installed and set to usable via I/O path numbers 1 and 2 by host computer A (13A0) as shown in FIG. 4A, 4B, 5A, 5B, 6A, and 6B. Then, a user of host computer A (13A0) makes a demand to the SoD center system (1100) to allocate 2 Terabytes of additional storage to host computer A (13A0). If the storage devices in the other storage subsystem, subsystem 12 (1412), which is connected to the same local SAN of the host computer A (13A0), cannot be allocated to the host computer A (13A0) for some reason, then the processing described herein below with reference to FIGS. 13–16 will allocate storage resources in another storage subsystem having the shortest distance to the host computer A (13A0). A result of this processing is that device numbers 3 and 4, which were marked as un-usable in the SoD status 15300 column of the device management table 15000 for storage subsystem 21 (1421) shown in FIG. 4B, are tagged as usable in the SoD status 15300 column of the device management table 15000 shown in FIG. 4C.

FIGS. 5A, 5B and 5C illustrate representative I/O port management tables in a specific embodiment of the present invention. FIG. 5A illustrates a representative I/O port management table 11000 for use in storage subsystem 11 (1411) in a specific embodiment according to the present invention. As shown in FIG. 5A, the I/O port management table 11000 comprises a plurality of columns, including an I/O port ID (11100), an installation status (11200), an SoD status (11300), and a device number (11400). In the representative example illustrated by FIG. 5A, entries exist for I/O port number 1110 (9210), I/O port 1120 (9220), through I/O port number 11m0 (92m0). Further, as indicated by the entries in the Installation status 11200 column, each of the I/O ports is installed. However, as indicated by the entries in the SoD status 11300 column, only I/O port number 1110 (9210) and I/O port number 1120 (9220) have been made usable, as currently configured in FIG. 5A. Accordingly, only devices that connect to these I/O port numbers are currently available.

FIG. 5B illustrates a representative I/O port management table 16000 for use in storage subsystem 21 (1421) in a specific embodiment according to the present invention. As shown in FIG. 5B, the I/O port management table 16000 comprises a plurality of columns, including an I/O port ID (16100), an installation status (16200), an SoD status (16300), and a device number (16400). In the representative example illustrated by FIG. 5B, entries exist for I/O port number 2110 (14210), I/O port 2120 (14220), through I/O port number 21m0 (142m0). Further, as indicated by the entries in the Installation status 16200 column, each of the I/O ports is installed. However, as indicated by the entries in the SoD status 16300 column, only I/O port number 2110 (14210) has been made usable, as currently configured in FIG. 5B. Accordingly, only devices that connect to this I/O port number are currently available.

FIG. 5C illustrates the representative I/O port management table 16000 of FIG. 5B after a demand to allocate an additional storage capacity in storage subsystem 21 (1421) is processed in a specific embodiment. A result of the processing described herein with reference to FIGS. 13–16, the I/O port ID number 2120, which was marked as unusable in the SoD status 16300 column of the I/O port management table 16000 for storage subsystem 21 (1421) shown in FIG. 5B, is tagged as usable in the SoD status 16300 column of the I/O port management table 16000 shown in FIG. 5C. Further, the device number 16400 column for the I/O port ID number 2120 in I/O port management table 16000 has been changed from N/A, as shown in FIG. 5B, to a "3, 4" to indicate that device number 3 and device number 4 are accessible via the I/O port ID 2120 in FIG. 5C.

FIGS. 6A, 6B and 6C illustrate representative I/O path setting tables in a specific embodiment of the present invention. FIG. 6A illustrates a representative I/O path setting table in a specific embodiment according to the present invention. FIG. 6A illustrates I/O path setting table 12000, which comprises a plurality of columns, including an I/O path number (12100), a host I/O controller number (12200), a subsystem number (12300), and an I/O port number (12400). As illustrated by the entries in the I/O path number 12100 column of the representative example of FIG. 6A, I/O path number 1 and I/O path number 2 are defined. The I/O path number 1 provides a connection from the host I/O controller ID A0 10 (8410) to devices in storage subsystem 11 (1411) through I/O port 1110 (9210). Similarly, the I/O path number 21 provides a connection from the host I/O controller ID A020 (8420) to devices in storage subsystem 11 (1411) through I/O port 1120 (9220) in the representative example illustrated by FIG. 6A.

FIG. 6B illustrates a representative I/O path setting table in a specific embodiment according to the present invention. FIG. 6B illustrates I/O path setting table 17000, which comprises a plurality of columns, including an I/O path number (17100), a host I/O controller number (17200), a subsystem number (17300), and an I/O port number (17400). As illustrated by the entries in the I/O path number 17100 column of the representative example of FIG. 6B, I/O path number 1 is defined. The I/O path number 1 provides a connection from the host I/O controller ID B010 (13410) to devices in storage subsystem 21 (1421) through I/O port 2110 (14210) in the representative example illustrated by FIG. 6B.

FIG. 6C illustrates the representative I/O path setting table 12000 of FIG. 6A after a demand to allocate an additional storage capacity in storage subsystem 21 (1421) is processed in a specific embodiment. FIG. 6C illustrates the representative I/O path setting table 12000 of FIG. 6A after a demand to allocate an additional storage capacity in storage subsystem 21 (1421) from a user of host computer A (13A0) is processed in a specific embodiment. A result of the processing described herein with reference to FIGS. 13–16, the I/O path number 3, which was marked as undefined in the host controller ID 12200 column of the I/O path setting able 12000 for host computer A (13A0) shown in FIG. 6A, is set to A030, the identifier of the host controller in the host computer A (13A0) that provides connectivity to the device(s) in the storage subsystem 21 (1421) allocated to the user of the host computer A (13A0), in the host controller ID 12200 column of the I/O path setting table 12000 shown in FIG. 6C. Further, the subsystem number 12300 column for the I/O path number 3 in the I/O path setting table 12000 has been changed from N/A, as shown in FIG. 6A, to a "21" to indicate that I/O path number 3 provides connectivity between host I/O controller A030 and storage device(s) in storage subsystem 21 (1421). Yet further, the I/O port ID 12400 column for the I/O path number 3 is changed from N/A, as shown in FIG. 6A, to a "2120" in FIG. 6C to indicate the I/O port of the storage subsystem 21 (1421) which provides connectivity to the storage device(s) allocated to the host computer A (13A0) is provided.

FIG. 7 illustrates a representative host computer location table in a specific embodiment of the present invention. As shown in FIG. 7, host computer location table (4000), which resides in SoD center system (1100), comprises columns such as a host computer number (4100), a latitude (4210), and a longitude (4220). The latitude column and the longitude column comprise host computer location data (4200).

FIG. 8 illustrates a representative subsystem location table in a specific embodiment of the present invention. As shown in FIG. 8, storage subsystem location table (5000) resides in SoD center system (1100). The storage subsystem location table (5000) includes columns such as a subsystem number (5100), a latitude (5210), and a longitude (5220), which together comprise storage subsystem location data (5200).

FIG. 9 illustrates a representative host computer location table in another specific embodiment of the present invention. As shown in FIG. 9, host computer location table (6000), which resides in SoD center system (1100), comprises columns such as a host computer number (6100), and a host computer location data (6200) that comprises an IP address.

FIG. 10 illustrates a representative subsystem location table in another specific embodiment of the present invention. As shown in FIG. 10, storage subsystem location table (7000) resides in SoD center system (1100). The storage subsystem location table (7000) includes columns such as a subsystem number (7100), and a storage subsystem location data (7200) that comprises an IP address.

FIG. 11 illustrates a flowchart of a representative processing flow in another specific embodiment of the present invention. As shown in FIG. 11, the SoD center system (1100) receives as input an SoD demand for a host computer in a step 2100. Then, in a step 2200, the SoD center system (1100) decides which storage subsystem to use for meeting the demand. The selection is made from the viewpoint of I/O performance between the host computer and the subsystem, in a specific embodiment. Then, in a step 2300, the SoD center system (1100) processes SoD service using the chosen subsystem for the host computer. Then, in a step 2400, an SoD service processing result is output.

FIG. 12 illustrates a flowchart of a representative processing for selecting a subsystem in a specific embodiment of the present invention. As shown in FIG. 12, step 2200 in FIG. 11, comprises a plurality of steps in which a storage subsystem for is selected to provide SoD service to a specific host computer. In a step 2220, the SoD center system (1100) reads location data for the host computer from the host computer location table (4000) shown in FIG. 7 or the host computer location table (6000) in FIG. 9. Then, in a step 2230, the SoD center system (1100) selects a storage subsystem from the storage subsystems which have a remaining uncalculated distance between the host computer and the storage subsystem. In a specific embodiment, subsystems are selected by picking up a subsystem, from the top of the table row, for example. The storage subsystem's distance to the host computer is not yet known to the SoD center system. Then in a step 2230, it is determined if the selected storage subsystem can meet the SoD demand. For example, can 2 Terabytes of additional storage capacity be allocated from the storage subsystem to the requesting host computer? If the selected storage subsystem can meet the demand, then in a step 2240, then SoD center system (1100) reads location data of the subsystem from storage subsystem location table (5000) in FIG. 8 or the storage subsystem location table (7000) in FIG. 10. Then, the SoD center system (1100) calculates the distance between the host computer and the subsystem in a step 2250. In a step 2260, a determination is made whether the distance computed in step 2250 is a new overall minimum. If the distance is an overall minimum, then the calculation result is recorded in a step 2270.

Otherwise, if in step 2230, it is determined that the selected subsystem cannot meet the demand, then the SoD center system (1100) skips steps 2240 through 2270. Then, in a step 2280 a determination is made whether there is any subsystem remaining in which the distance has not been calculated. If in step 2280, it is determined that another subsystem remains, then, the SoD center system (1100) continues processing with the step 2220 and repeats the steps from step 2220. Otherwise, if no further storage subsystems remain, then the SoD center system (1100) outputs the recorded result in a step 2290.

There are a variety of ways to calculate a distance between a host computer and a subsystem that may be used in various specific embodiments of the present invention. For example, one technique is based on geographical information for host computers and storage subsystems. As shown in FIG. 7, geographic information such as latitude and longitude may be kept for each host computer in a host computer location table (4000). Further, as shown in FIG. 8, geographic information such as latitude and longitude may be kept for each storage subsystem in a storage subsystem location table (5000). Both tables may be maintained in the SoD center system (1100) in a specific embodiment. A variety of techniques for calculating a distance between any two points knowing their latitude and longitude information exist. One technique, provided merely by way of an example, calculates a distance, D, between two cities, p and q, having a latitude and a longitude of (a1,b1) and (a2,b2), respectively, using the following formula:

$$D = Arccos[Cos[a1]Cos[b1]Cos[a2]Cos[b2] + Cos[a1]Sin[b1]Cos[a2] Sin[b2] + Sin[a1]Sin[a2]]/360 * 2Pi * r$$

Where r is the radius of the earth. For a detailed description of a derivation of this formula, reference may be had to: http://forum.swarthmore.edu/dr.math/problems/longandlat.html (last access Mar. 29, 2001), which is incorporated herein by reference in its entirety for all purposes.

In another representative example, the distance between the storage subsystem and the host is computed based upon IP addresses stored in the host location table (6000) in FIG. 9 and the storage subsystem location table (7000) in FIG. 10. For further detail regarding computing distance between two machines based upon their IP addresses, reference may be had to: http://buffy.eecs.berkeley.edu/Seminars/Old.99/April/990407.jamin.html (last access Mar. 29, 2001), which is incorporated herein by reference in its entirety for all purposes. Accordingly, in the representative example specific embodiment illustrated by FIGS. 7 and 8, the storage subsystem 21 (1421) is the nearest one to host computer A (13A0) of the storage subsystems outside of local SAN 1 (1510).

FIG. 13 illustrates a flowchart of representative SoD service module processing in an SoD center system in a specific embodiment according to the present invention. The SoD service module (2300) performs processing illustrated by the flowchart in FIG. 13, responsive to the SoD center system (1100) requests to allocate storage devices in the storage subsystem 21 (1421), whose resources are partly used by host computer B (13B0), to host computer A (13A0). In a step 2310, the SoD center system 1100 sends the demand to SoD resource manager 14300 of storage subsystem 21 1421, and receives a management result from the SoD resource manager 14300 in a step 2320. The SoD center system 1100 stores the result in a step 2330. In a step 2340, the SoD center system 1100 sends an I/O path setting request to the SoD agent 8100 in the host computer A 13A0 connected to the storage subsystem 1200. The I/O path setting request comprises information about resources in the various components of the storage on demand system that comprise a path between the host computer A 13A0 and storage resources allocated in storage subsystem 21 1421. In a specific embodiment, the resources, such as host I/O controllers in the host computer and I/O ports in the remotable storage subsystem, are assigned unique identifiers, analogous to world wide names (WWN) used in fibre channel networks, for example. The I/O path setting request includes the unique identifiers of the resources in the storage on demand system that exist along the path to be set in order for users at the host computer A 13A0 to access the storage resources in the storage subsystem 21 1421. Then, the SoD center system 1100 receives the setting result from the agent 8100 in a step 2350. The SoD center system 1100 stores the result in a step 2360 and completes the processing of FIG. 13.

FIG. 14 illustrates a flowchart of representative SoD resource manager processing in a specific embodiment according to the present invention. In FIG. 14, the SoD resource manager 14300 in storage subsystem 21 (1421) receives the SoD demand from the SoD center system 1100 in a step 22100. In a decisional step 22200, it is determined whether the demand includes a command to the SoD resource manager 14300 to make an installed device usable. If the demand includes the command to make an installed device usable, then the SoD resource manager 14300 updates the device management table 15000 in a step 22300, updates the I/O port management table 16000 in a step 22400, and sends a table update result to the SoD center system (1100) in a step 22500. Otherwise, if in step 22200, it is determined that the demand does not include a command to make an installed device usable, the SoD resource manager 14300 skips the step 22300, and continues processing with step 22400.

FIG. 15 illustrates a flowchart of representative SoD agent processing in a specific embodiment according to the present invention. In FIG. 15, the SoD agent 8100 in host computer A (13A0) receives an I/O path setting request from the SoD center system (1100) in a step 23100. Then, the SoD agent requests that the operating system (8200) update the I/O path setting table 12000 based upon the I/O path setting request in a step 23200. The SoD agent 8100 takes the unique identifier or identifiers corresponding to resources along the path to be established and formats requests to the operating system to set up the appropriate paths. The operating system 8200 may be any of a variety of operating systems, such as OS/390, UNIX, and Windows, which have the function of setting and controlling I/O paths. The formatting of the I/O setting request will be unique to the particular operating system 8200, and will be readily apparent to those of ordinary skill in the art. The SoD agent 8100 receives an update result from the operating system 8200 in a step 23300. Then, the SoD agent sends a setting result to the SoD center system 1100 in a step 23400.

FIG. 16 illustrates a flowchart of representative SoD resource manager processing for a storage access request in a specific embodiment according to the present invention. The SoD resource manager 14300 manages storage resources and I/O ports in the storage subsystem 21 (1421). In FIG. 16, the SoD resource manager 14300 receives an I/O command to use storage resources from the host computer A 13A0 in a step 24100. In a decisional step 24200, the SoD resource manager checks the tables 15000 and 16000 to see if the resources are currently available. If in step 24200, it is determined that the resources are available, then the SoD resource manager 14300 performs the I/O command in a step 24300. Then, the SoD resource manager 14300 sends an I/O result to the host computer A 13A0 in a step 24500. Otherwise, if in step 24200, it is determined that any of the resources are not available, the SoD resource manager 14300 rejects the I/O command in a step 24400, skips step 24300, and sends the result back to host computer 13A0 in step 24500. In a specific embodiment, the I/O result is a return code. However, in select embodiments, the I/O result can comprise the information read from the disk when the I/O command has successfully executed.

An alternative embodiment of the present invention employing a multiple tier network strategy will now be described with reference to FIGS. 17–25.

FIG. 17 illustrates a diagram of a representative system for embodying a centralized SoD service in a global SAN environment in another specific embodiment of the present invention. As illustrated in FIG. 17, the SoD service system includes an SoD center system (1100) linked via a Wide Area Network (WAN) for messaging (1200) with a plurality of storage subsystems, including a storage subsystem 11 (1411) and a storage subsystem 12 (1412). A plurality of host computers, including a host computer A1 (13A1) and a host computer A2 (13A2) are connected to a local SoD management server 1 (2510) by a second network, LAN 1300. The storage subsystems and the host computers are connected to each other via a global data network comprised of local SAN 1 (1510). Further, local SAN 1 (1510) connects to a WAN for dataflow (1600).

The SoD center system (1100) includes a computer connected to an input device, an output device, a storage device, and a communications line connected to WAN for messaging (1200). In a specific embodiment, the input device is a combination of a keyboard and a mouse. The output device can be a display, for example. The storage device may be a magnetic disk, an optical disk, a magnetic-optical disk, or a semiconductor memory in various specific embodiments. This device has sufficient storage capacity to store within it files for execution of programs and an accompanying amount of data. In a specific embodiment, the communications line is capable of a high-speed communications. In specific embodiments, the SoD center system (1100) is implemented using a general purpose computer system. In various specific embodiments, the WAN for messaging (1200) can be the Internet, another wide area network comprised of private communications lines, or a combination of both.

In various specific embodiments, the topologies of the local SAN 1 (1510), can be point-to-point, arbitrated loop, or fabrics. Fibre channel (FC) is one protocol used in a presently preferred embodiment, however, other protocols can also be used in various other specific embodiments. The WAN for dataflow (1600) employs a fibre channel (FC) protocol in a presently preferred embodiment. However, other protocols may be used for the WAN for dataflow (1600), such as the Internet Protocol (IP), in various other specific embodiments. Thus, the Internet can be used both for WAN for messaging (1200) and for WAN for dataflow (1600) at the same time in a specific embodiment.

FIG. 18 illustrates a representative local SoD management server table in a specific embodiment of the present invention. As shown in FIG. 18, a management server table 26000 comprises one or more entries for the management servers used in a particular system. An entry for a particular management server, such as management server 1 (2510) includes a local management server ID 26100 and a corresponding address of the local SoD management server 26200 column.

FIGS. 19A–19C illustrate diagrams of representative local SoD management servers in various specific embodiments of the present invention. As shown in FIG. 17, local SoD management server 1 (2510) is connected to storage subsystem 11 (1411), storage subsystem 12 (1412), and SoD center system (1100) by a WAN for messaging 1200. The SoD management server 1 (2510) includes a computer connected to an input device, an output device, a storage device, and a communications line connected to WAN for messaging (1200). In a specific embodiment, the input device is a combination of a keyboard and a mouse. The output device can be a display, for example. The storage device may be a magnetic disk, an optical disk, a magnetic-optical disk, or a semiconductor memory in various specific embodiments. This device has sufficient storage capacity to store within it files for execution of programs and an accompanying amount of data. In a specific embodiment, the communications line is capable of a high-speed communications. In specific embodiments, the SoD management server 1 (2510) is implemented using a general purpose computer system. The SoD management server 1 (2510) further comprises a processor, that executes instructions, which are embodied in the form of program code and reside in a memory which is connected to the processor by a system bus. In a specific embodiment, a local SoD manager program 27100 is disposed in the memory of the SoD management server 1 (2510).

Various kinds of information may be managed by the SoD management server in specific embodiments of the present invention. For example, in FIG. 19A, a specific embodiments is illustrated in which a local host computer location table 28000, a local storage subsystem location table 29000, one or more device management tables, one or more I/O port management tables, and one or more I/O path setting tables may be disposed within the memory of the local SoD management server 1 (2510). FIG. 19B illustrates another specific embodiment, in which a local host computer location table 28000, a local storage subsystem location table 29000, and one or more device management tables, one or more I/O port management tables are disposed in the memory of the local SoD management server 1 (2510). Further, as illustrated in FIG. 19C, in another specific embodiment, the SoD management server 1 (2510) holds a local host computer location table 28000 and a local storage subsystem location table 29000 in the memory.

FIG. 20 illustrates a representative local host computer location table in a specific embodiment of the present invention. As shown in FIG. 20, an example local host computer location table 28000 in a specific embodiment comprises a host computer number 28100 column, and a host computer location data 28200 column. The host computer location data 28200 column comprises a latitude 28210 column and a longitude 28220 column. One or more entries can exist in the local host computer location table 28000 for the host computers known locally to the system. Each entry provides an identifier for the host computer, and a latitude and longitude for the location of the computer.

FIG. 21 illustrates a representative local storage subsystem location table in a specific embodiment of the present invention. As shown in FIG. 21, an example local storage subsystem location table 29000 in a specific embodiment comprises a storage subsystem number 29100 column, and a storage subsystem location data 29200 column. The storage subsystem location data 29200 column comprises a latitude 29210 column and a longitude 29220 column. One or more entries can exist in the local storage subsystem location table 29000 for the storage subsystems known locally to the system. Each entry provides an identifier for the storage subsystem, and a latitude and longitude for the location of the storage subsystem.

FIG. 22 illustrates a flowchart of representative local SoD manager processing in a specific embodiment according to the present invention. As shown in FIG. 22, the SoD management server 1 (2510) receives as input an SoD demand from a host computer A1 in a step 30010. Then, in a decisional step 30020, the SoD management server 1 (2510) determines whether any of the storage subsystems in the same local SAN as that of the host computer Al, which made the demand, can meet the demand. If the SoD management server 1 (2510) finds a storage subsystem within the local SAN that can meet the demand, then processing proceeds with step 2300. Otherwise, if none of the storage subsystems in the local SAN can meet the demand, then in a step 30030, the SoD management server 1 (2510) sends a request to the SoD center system (1100) to choose a storage subsystem outside of the local SAN. The request comprises information about the requester so that the SoD center system (1100) can select the "best" storage subsystem to satisfy the request. The SoD center system (1100) knows about the other local SoD management servers, such as local SoD management server 2, local SoD management server 3, and so forth, because the SoD center system (1100) has access to the local SoD management server table 26000, as described with reference to FIG. 18. Accordingly, the local SoD management server 1 (2510) makes a request to the SoD center system (1100) to select a suitable storage subsystem to meet the demand. The SoD center system (1100) makes a selection using a process such as that illustrated herein with reference to FIG. 23, in an example specific embodiment, and sends a message to the SoD management server 1 (2510) informing it of the selection. Then, in a step 30040, the management server 1 (2510) receives the message sent by the SoD center system (1100), which contains the selected storage subsystem from the SoD center system (1100). Then, in a step 30050, the management server 1 (2510) adds information about the chosen subsystem received in step 30040 to the local storage subsystem location table (29000). Accordingly, the local SoD management server 1 (2510) can manage the selected storage subsystem using this information. Then, in a step 2300, the SoD management server 1 (2510) processes SoD service using the chosen subsystem for the host computer A1 (13A1). Then, in a step 2400, an SoD service processing result is output to the SoD center system (1100).

FIG. 23 illustrates a flowchart of representative SoD center system processing in a specific embodiment according to the present invention. As shown in FIG. 23, the SoD center system (1100) receives a request from a local SoD management server 1 (2510) to choose a storage subsystem in a step 31010. In a step 31020, the SoD center system (1100) sends requests to determine candidate storage subsystems in which storage resources may be allocated to the remaining local SoD management servers. In a step 31030, the SoD center system (1100) receives responses that include identities of candidate storage subsystems from the SoD management servers. Accordingly, the SoD center system has candidates for the "best" storage subsystem in the responses from the local SoD management servers. Then, in a step 31040, the SoD center system (1100) selects a best candidate from among the candidate storage subsystems indicated by the responses from the SoD management servers. The SoD center system selects a best storage subsystem from among the candidates using the selection processing described herein above with reference to a specific embodiment illustrated in FIG. 12. A variety of ways of determining a best management server can be used in various specific embodiments. For example, in a specific embodiment, the SoD center system can select a management server by choosing a management server having a minimum distance with the host computer. Other techniques based on distance, or routing times, can also be used in other specific embodiments, such as for example selecting the management server having a minimum routing time. Then, in a step 31050, the SoD center system (1100) sends the decision to the SoD management server 1 (2510).

FIG. 24 illustrates a flowchart of representative SoD center system processing in a specific embodiment according to the present invention. As shown in FIG. 24, the SoD center system (1100) receives an SoD processing result from a local SoD manager process 27100 in the SoD management server 1 (2510) in a step 32010. In a specific embodiment, the processing result comprises the following information: a subsystem number for the chosen subsystem; a device number for the chosen device in the chosen subsystem; and an I/O port ID for the chosen I/O port in the chosen subsystem, for example. Then, in a step 32020, the SoD center system (1100) sends a request to update related tables to the local SoD management servers based upon the information received in step 32010. The tables in the local management server which are updated include tables other than 28000 and 29000, such as for example, device management tables, I/O port management tables, and I/O path setting tables related to the host computers and/or storage subsystems in each local SAN, for example. Next, in a step 32030, the SoD center system (1100) receives update results from the local SoD management servers, and in a step 32040, outputs a result. In a specific embodiment, the result can be a return code such as OK or NG, for example.

FIG. 25 illustrates a flowchart of representative local SoD manager processing in a specific embodiment according to the present invention. As shown in FIG. 25, the local SoD management servers receive a request from the SoD center system to update related tables in a step 33010. Then, in a step 33020, the related tables are updated, and in a step 33030, the results of updating the related tables are sent to the SoD center system (1100).

The preceding has been a description of the preferred embodiment of the invention. It will be appreciated that deviations and modifications can be made without departing from the scope of the invention, which is defined by the appended claims.

What is claimed is:

1. A storage management system, comprising:
   a storage on demand (SoD) center system;
   a local storage subsystem:
   a plurality of remote storage subsystems, each remote storage subsystem having an SoD resource manager that manages storage resources of said remote storage subsystem; and
   a software agent operable on a host computer, said software agent using said local storage subsystem to store information when said local storage subsystem can meet a storage request, said software agent communicating with the SoD center system when said local storage subsystem cannot meet said storage request; wherein
   said SoD center system, in response to a demand for storage resources from the host computer, automatically uses geographic criteria to select at least one of said plurality of remote storage subsystems to satisfy said demand; and wherein
   said SoD resource manager for said selected one of said remote storage subsystems allocates at least one of a plurality of resources to meet said demand.

2. The system of claim 1, wherein the automatically using geographic criteria to select at least one of said plurality of remote storage subsystems to satisfy said demand is accomplished by a minimum geographic distance analysis.

3. The system of claim 2, wherein the minimum geographic distance analysis comprises determining a minimum of at least one of a plurality of differences between two points specified by a longitude and a latitude.

4. The system of claim 1, wherein the automatically using geographic criteria to select at least one of said plurality of remote storage subsystems to satisfy said demand comprises
   determining whether said at least one of said plurality of remote storage subsystems has sufficient resources to satisfy said demand prior to determining said selected remote storage system from among remaining ones of said plurality of remote storage systems by finding a minimum network routing distance.

5. The system of claim 1, further comprising a second host computer coupled to one of said plurality of remote storage subsystems, wherein said second host computer accesses said local storage subsystem when said one of said plurality of storage subsystems lacks sufficient resources to satisfy a demand for storage resources for said second host computer.

6. A storage apparatus comprising:
   memory;
   a plurality of storage devices
   a plurality of I/O ports providing interfaces to said plurality of storage devices;
   a device management table, in which a status of at least one of said plurality of storage devices is stored, and an I/O port management table, in which a status of at least one of said plurality of I/O ports is stored, said device management table and said I/O port management table being disposed in said memory; and
   a storage resource management processor; wherein
   said storage management processor receives a demand for storage resources, and thereupon updates said device management table and said I/O port management table, and sends a management result responsive to said demand; and wherein an operating system of a remote computer is automatically configured with at least one of a plurality of paths connecting to storage resources allocated at least one of said plurality of storage devices, thereby automatically configuring the remote computer to communicate directly with the storage resources.

7. A method for enabling a host computer to access storage resources, said host computer, at least one of a plurality of remote storage subsystems, and a center system interconnected by a first communication network, said method comprising:
   receiving at said center system a demand from said host computer for storage resources;
   automatically using geographic criteria to select a remote storage subsystem from said at least one of a plurality of remote storage subsystems in which sufficient resources exist to meet said demand;
   processing said demand using said selected remote storage subsystem; and
   outputting a service processing result enabling said host computer to access storage resources.

8. The method of claim 7, wherein the using geographic criteria to select a remote storage subsystem from said at least one of a plurality of remote storage subsystems comprises:
   reading a first location data for said host computer;
   for each remote storage subsystem in said at least one of a plurality of remote storage subsystems:
      determining if said remote storage subsystem can satisfy said demand;
      if said remote storage subsystem can satisfy said demand, then reading a second location data for said remote storage subsystem, otherwise performing said determining for a next remote storage subsystem;
      computing a distance from said first location data and said second location data;
      if said distance is a minimum, then recording said distance as a calculation result;
   if there are any remote storage subsystems remaining, performing said determining, reading, computing and recording for said remaining remote storage subsystems; and
   outputting said calculation result.

9. The method of claim 7, wherein processing said demand using said selected remote storage subsystem comprises:
   sending said demand for storage resources to said selected remote storage subsystem;
   receiving from said selected remote storage subsystem a management result, said management result indicating whether storage resources have been successfully allocated in accordance with said demand;
   storing said management result;
   sending said I/O path setting request to said host computer;
   receiving a setting result from said host computer; and
   storing said setting result.

10. A method for automatically configuring a remote storage subsystem to provide storage resources to a host computer, said host computer, said remote storage subsystem, a local storage subsystem, and a center system interconnected by a first communication network, said method comprising:
   receiving a demand for storage resources at said remote storage subsystem;

determining whether said demand includes a command to make at least one of a plurality of installed devices available;

updating a device management table, if said demand includes a command to make at least one of a plurality of installed devices available;

updating an I/O port management table; and sending a resource management result to said center system.

11. The method of claim 10, wherein updating a device management table comprises storing an indication that a particular device is usable.

12. The method of claim 10, wherein updating a I/O port management table comprises storing an indication that a particular I/O port is usable.

13. The method of claim 10, further comprising:

receiving at said storage subsystem an I/O command to access storage resources from said host computer;

determining whether storage resources requested by said I/O command are usable;

performing said I/O command, if said storage resources requested by said I/O command are usable, otherwise rejecting said I/O command; and sending an I/O result to said host computer.

14. The method of claim 13, wherein determining whether storage resources requested by said I/O command are usable comprises:

searching said device management table to determine whether devices requested in said I/O command are usable.

15. The method of claim 14, wherein determining whether storage resources requested by said I/O command are usable further comprises:

searching said I/O port management table to determine whether I/O ports requested in said I/O command are usable and whether devices requested in said I/O command are accessible via I/O ports requested in said I/O command.

16. A method for automatically configuring a host computer to access resources in a remote storage subsystem, said host computer, said remote storage subsystem, and a center system interconnected by a first communication network, said method comprising:

receiving at said host computer an I/O path setting request from said center system, said I/O path setting request comprising information about resources in said remote storage subsystem allocated for use by said host computer;

requesting an operating system resident in said host computer to update an I/O path setting table based upon said I/O path setting request;

receiving an update result from said operating system; and sending a setting result to said center system based upon said update result.

17. The method of claim 16, wherein updating said I/O path setting table comprises storing an indication that a particular I/O port in said storage subsystem is accessible to a particular host I/O controller.

18. A storage management service system, comprising:

a host computer;

a local management server associated with said host computer;

a plurality of local storage subsystems associated with said local management server;

a storage on demand (SoD) center system;

a plurality of other management servers associated with said center system; and a plurality of remote storage subsystems associated with said other management servers; wherein said local management server receives input of a demand for storage resources for said host computer, decides whether any of said plurality of local storage subsystems can satisfy said demand, and thereupon sends said demand to a selected one of said plurality of storage subsystems, otherwise, said local management server sends said demand to said center system; and wherein said center system requests from at least one of said plurality of other management servers candidates from said plurality of remote storage subsystems, said candidates having sufficient resources to satisfy said demand; and responsive to receiving candidates, said center system automatically uses geographic criteria to select a remote storage subsystem to satisfy said demand; and wherein said selected remote storage subsystem receives said demand from said center system, and thereupon allocates resources to meet said demand.

19. A method for enabling a host computer to access storage resources, said method comprising:

receiving at a local management server an input of a demand from said host computer for storage resources;

determining whether at least one of a plurality of local storage subsystems can meet said demand, and if one of said at least one of a plurality of local storage subsystems can meet said demand, selecting said local storage subsystem as a selected storage subsystem;

if none of said plurality of local storage subsystems can meet said demand, sending a request to a center system to select a remote storage subsystem from a plurality of remote storage subsystems that contains sufficient resources to meet said demand and that is determined to be closest to the host computer; and receiving identification information of the selected a remote storage subsystem;

processing said demand using said selected storage subsystem; and outputting a service processing result enabling said host computer to access storage resources in said selected storage subsystem.

20. The method of claim 19, wherein processing said demand using said selected storage subsystem comprises:

sending said demand for storage resources to said selected storage subsystem;

receiving from said selected storage subsystem a management result, said management result indicating whether storage resources have been successfully allocated in accordance with said demand;

storing said management result;

sending said I/O path setting request to said host computer;

receiving a setting result from said host computer; and storing said setting result.

21. A method for enabling a host computer to access storage resources, said host computer and a local management server being interconnected by a first communication network, a center system and at least one of a plurality of local storage subsystems being interconnected to said first communication network via a second communication network, and at least one of a plurality of remote storage subsystems being interconnected to at least one of a plurality of other local management servers by said second communication network, said method comprising:

receiving at said center system a request from said local management server to select one of said plurality of remote storage subsystems;

sending a request to determine candidates from among said at least one of a plurality of remote storage subsystems to said at least one of a plurality of other local management servers, said candidates having sufficient resources in order to meet said demand;

receiving at said center system candidates from said plurality of other local management servers;

automatically using geographic criteria to select a remote storage subsystem from candidates; and sending to said local management server said selected remote storage subsystem, enabling said host computer to access storage resources.

22. The method of claim 20, further comprising:

receiving at said center system a service processing result from said local management server;

sending a request to update tables to said local management server and at least one of a plurality of other local management servers;

receiving at said center system updating results from at least one of said a plurality of other local management servers; and providing as output said updating results.

23. A method for enabling a host computer to access storage resources, said host computer and a local management server being interconnected by a first communication network, a center system and at least one of a plurality of local storage subsystems being interconnected to said first communication network via a second communication network, and at least one of plurality of remote storage subsystems being interconnected to at least one of a plurality of other local management servers by said second communication network, wherein a remote storage subsystem is selected from the plurality of the storage subsystems automatically using geographic criteria, said method comprising:

receiving at said local management server and said at least one of a plurality of other local management servers a request to update tables to reflect an allocation of resources in said at least one of a plurality of remote storage subsystems to said host computer;

updating tables in accordance with said request; and sending to said center system an updating result.

24. The method of claim 23, wherein said tables further comprise at least one of a table of host computer locations comprising a longitude and a latitude, and a table of storage subsystem locations comprising a longitude and a latitude.

* * * * *